United States Patent
Silver et al.

(10) Patent No.: US 7,058,225 B1
(45) Date of Patent: Jun. 6, 2006

(54) FAST HIGH-ACCURACY MULTI-DIMENSIONAL PATTERN INSPECTION

(75) Inventors: William Silver, Weston, MA (US); Aaron Wallack, Natick, MA (US); Adam Wagman, Framingham, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 10/705,454

(22) Filed: Nov. 10, 2003

Related U.S. Application Data

(63) Continuation of application No. 09/746,147, filed on Dec. 22, 2000, now Pat. No. 6,658,145, which is a continuation of application No. 09/001,869, filed on Dec. 31, 1997, now abandoned, which is a continuation-in-part of application No. 08/979,588, filed on Nov. 26, 1997, now abandoned.

(51) Int. Cl.
*G06K 9/62* (2006.01)
*G06K 9/48* (2006.01)

(52) U.S. Cl. ...................... 382/209; 382/199
(58) Field of Classification Search ................ 382/159, 382/181, 190, 197, 199, 201, 203, 204, 209, 382/241–243, 294; 706/20
See application file for complete search history.

(56) References Cited

U.S. PATENT DOCUMENTS

| | | |
|---|---|---|
| 3,069,654 A | 12/1962 | Hough et al. |
| 3,986,007 A | 10/1976 | Ruoff, Jr. |
| 4,146,924 A | 3/1979 | Birk et al. |
| 4,581,762 A | 4/1986 | Lapidus et al. |
| 4,618,989 A | 10/1986 | Tsukune et al. |
| 4,707,647 A | 11/1987 | Coldren et al. |
| 4,972,359 A | 11/1990 | Silver et al. |
| 5,245,674 A | 9/1993 | Cass et al. |

(Continued)

OTHER PUBLICATIONS

Gorman "Recognition of incomplete polygonal objects", IEEE, pp. 518-522, 1989.*

(Continued)

*Primary Examiner*—Daniel Miriam
(74) *Attorney, Agent, or Firm*—Russ Weinzimmer

(57) ABSTRACT

A method and apparatus are provided for identifying differences between a stored pattern and a matching image subset, where variations in pattern position, orientation, and size do not give rise to false differences. The invention is also a system for analyzing an object image with respect to a model pattern so as to detect flaws in the object image. The system includes extracting pattern features from the model pattern; generating a vector-valued function using the pattern features to provide a pattern field; extracting image features from the object image; evaluating each image feature, using the pattern field and an n-dimensional transformation that associates image features with pattern features, so as to determine at least one associated feature characteristic; and using at least one feature characteristic to identify at least one flaw in the object image. The invention can find at least two distinct kinds of flaws: missing features, and extra features. The invention provides pattern inspection that is faster and more accurate than any known prior art method by using a stored pattern that represents an ideal example of the object to be found and inspected, and that can be translated, rotated, and scaled to arbitrary precision much faster than digital image re-sampling, and without pixel grid quantization errors. Furthermore, since the invention does not use digital image re-sampling, there are no pixel quantization errors to cause false differences between the pattern and image that can limit inspection performance.

45 Claims, 29 Drawing Sheets

U.S. PATENT DOCUMENTS

| | | | |
|---|---|---|---|
| 5,343,390 | A | 8/1994 | Doi et al. |
| 5,351,310 | A | 9/1994 | Califano et al. |
| 5,459,636 | A * | 10/1995 | Gee et al. .................. 706/20 |
| 5,515,453 | A | 5/1996 | Hennessey et al. |
| 5,544,254 | A * | 8/1996 | Hartley et al. ............. 382/108 |
| 5,550,937 | A * | 8/1996 | Bell et al. .................. 382/293 |
| 5,694,482 | A | 12/1997 | Maali et al. |
| 5,703,960 | A | 12/1997 | Soest |
| 5,828,769 | A | 10/1998 | Burns |
| 6,026,186 | A * | 2/2000 | Fan ........................... 382/201 |
| 6,128,405 | A * | 10/2000 | Fujii .......................... 382/154 |
| 6,226,418 | B1 * | 5/2001 | Miller et al. .............. 382/294 |

OTHER PUBLICATIONS

Hügli, et al. "Geometric matching of 3D objects assessing the range of successful initial configurations", IEEE, pp. 101106, 1997.*

Cognex Corporation, "Description Sobel Search," Natick, MA USA, 1998 but public before the above-referenced filing date.

Cognex Corporation, "Chapter 7 CONLPAS," Cognex 3000/4000/5000 Programmable Vision Engines, Vision Tools, 1996, pp. 307-340, Revision 7.4 590-0136, Natick, MA USA.

Hu, Yu Hen, "CORDIC-Based VLSI Architectures for Digital Signal Processing," IEE Signal Processing Magazine, Jul. 1992, pp. 16-35, 1053-5888/92, USA.

Hu, et al, "Expanding the Range of Convergence of the CORDIC Algorithm," IEEE Transactions on computers, Jan. 1991, pp. 13-21, vol. 40, No. 1, USA.

Ballard, D.H., "Generalizing the Hough Transform to Detect Arbitrary Shapes," Pattern Recognition, 1981, pp. 111-122, vol. 13, No. 2, Pergaman Press Ltd., UK.

Lin, et al., "On-Line CORDIC Algorithms," IEEE Transactions on Computers, pp. 1038-1052, vol. 39, No. 8, USA.

Wallack, Aaron Samuel, "Chapter 4 Robust Algorithms for Object Localization," Algorithms and Techniques for Manugacturing, 1995, pp. 97-148 (and Bibliography pp. 324-335) PhD thesis, Unversity of California at Berkeley, USA.

James D. Foley, Andries Van Dam, Steven K. Feiner, John F. Hughes, Second Edition in C, Introduction to Computer Graphics, pp. 36-49, Addison-Wesley Publishing Company, 1994, USA.

Lisa Gottesfeld Brown, *A Survey of Image Registration Techniques*, Department of Computer Science, Columbia University, New York, NY 10027, ACM Computing Surveys, vol. 24, No. 4, Dec. 1992.

Gunilla Borgefors, *Hierarchical Chamfer Matching:* A Parametric Edge Matching Algorithm, IEEE Transactions on Pattern Analysis and Machine Intelligence, vol. 10, No. 6, Nov. 1988.

Daniel P. Huttenlocher and William J. Rucklidge, *A Multi-Resolution Technique for Comparing Images Using the Hausdorff Distance*, Department of Computer Science, Cornell University, Ithaca, NY 14853.

I.J. Cox and J.B. Kruskal (AT&T Bell Laboratories, Murray Hill, NJ), *On the Congruence of Noisy Images to Line Segment Models*, IEEE, 1988.

Daniel P. Huttenlocher, Gregory A. Klanderman and William J. Rucklidge, *Comparing Images Unsing the Hausdorff Distance*, IEEE Transaction on Pattern Analysis and Machine Intelligence, Vo. 15, No. 9, Sep. 1993.

Akinori Kawamura, Koji Yura, Tatsuya Hayama, Yutaka Hidai, Tadatashi Minamikawa, Akio Tanaka and Shoichi Masuda, On-line *Recognition of Freely Handwritten Japanese Characters Using Directional Features Densities*, IEEE 1992.

* cited by examiner

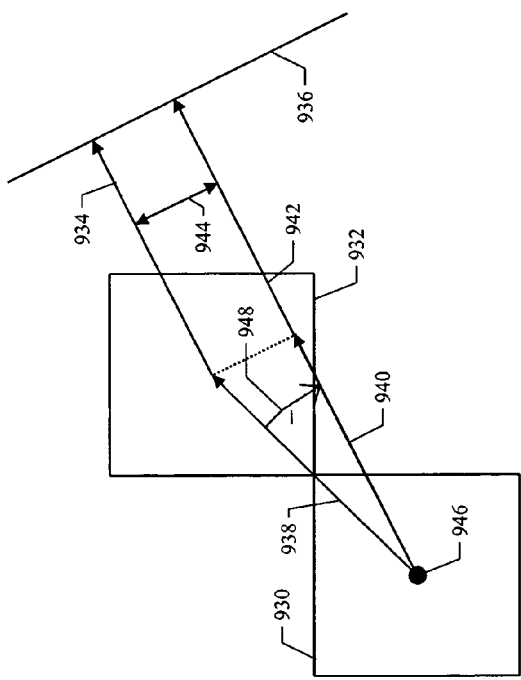
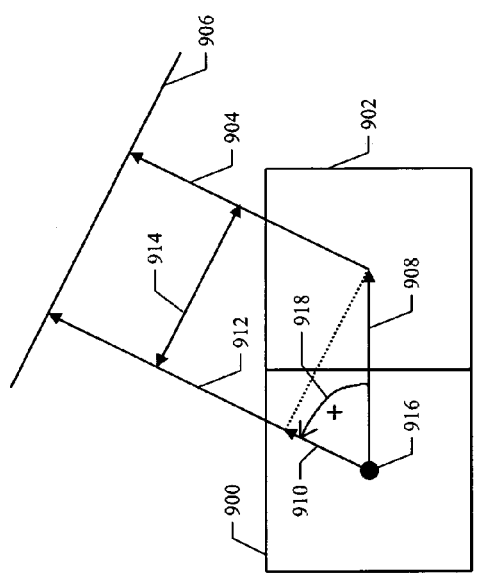
Figure 9a
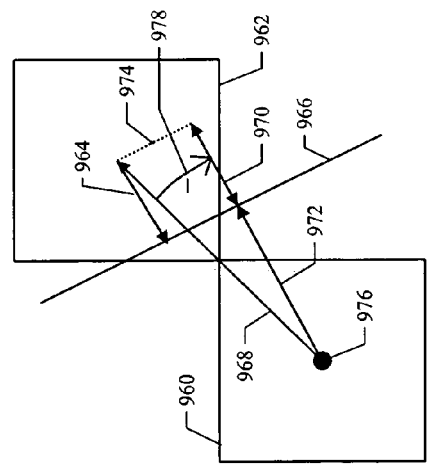
Figure 9b
Figure 9c

FAST HIGH-ACCURACY MULTI-DIMENSIONAL PATTERN INSPECTION

CROSS REFERENCE TO RELATED APPLICATIONS

This is a continuation of U.S. patent application Ser. No. 09/746,147, filed Dec. 22, 2000, which is now U.S. Pat. No. 6,658,145 issued Dec. 2, 2003, which is a continuation of U.S. patent application Ser. No. 09/001,869, filed Dec. 31, 1997, which is now abandoned, which is a continuation-in-part to U.S. patent application Ser. No., 08/979,588, filed Nov. 26, 1997, which is now abandoned.

FIELD OF THE INVENTION

This invention relates to machine vision, and particularly to systems for pattern inspection in an image.

BACKGROUND OF THE INVENTION

Digital images are formed by many devices and used for many practical purposes. Devices include TV cameras operating on visible or infrared light, line-scan sensors, flying spot scanners, electron microscopes, X-ray devices including CT scanners, magnetic resonance imagers, and other devices known to those skilled in the art. Practical applications are found in industrial automation, medical diagnosis, satellite imaging for a variety of military, civilian, and scientific purposes, photographic processing, surveillance and traffic monitoring, document processing, and many others.

To serve these applications the images formed by the various devices are analyzed by digital devices to extract appropriate information. One form of analysis that is of considerable practical importance is determining the position, orientation, and size of patterns in an image that correspond to objects in the field of view of the imaging device. Pattern location methods are of particular importance in industrial automation, where they are used to guide robots and other automation equipment in semiconductor manufacturing, electronics assembly, pharmaceuticals, food processing, consumer goods manufacturing, and many others.

Another form of digital image analysis of practical importance is identifying differences between an image of an object and a stored pattern that represents the "ideal" appearance of the object. Methods for identifying these differences are generally referred to as pattern inspection methods, and are used in industrial automation for assembly, packaging, quality control, and many other purposes.

One early, widely-used method for pattern location and inspection is known as blob analysis. In this method, the pixels of a digital image are classified as "object" or "background" by some means, typically by comparing pixel gray-levels to a threshold. Pixels classified as object are grouped into blobs using the rule that two object pixels are part of the same blob if they are neighbors; this is known as connectivity analysis. For each such blob we determine properties such as area, perimeter, center of mass, principal moments of inertia, and principal axes of inertia. The position, orientation, and size of a blob is taken to be its center of mass, angle of first principal axis of inertia, and area, respectively. These and the other blob properties can be compared against a known ideal for proposes of inspection.

Blob analysis is relatively inexpensive to compute, allowing for fast operation on inexpensive hardware. It is reasonably accurate under ideal conditions, and well-suited to objects whose orientation and size are subject to change. One limitation is that accuracy can be severely degraded if some of the object is missing or occluded, or if unexpected extra features are present. Another limitation is that the values available for inspection purposes represent coarse features of the object, and cannot be used to detect fine variations. The most severe limitation, however, is that except under limited and well-controlled conditions there is in general no reliable method for classifying pixels as object or background. These limitations forced developers to seek other methods for pattern location and inspection.

Another method that achieved early widespread use is binary template matching. In this method, a training image is used that contains an example of the pattern to be located. The subset of the training image containing the example is thresholded to produce a binary pattern and then stored in a memory. At run-time, images are presented that contain the object to be found. The stored pattern is compared with like-sized subsets of the run-time image at all or selected positions, and the position that best matches the stored pattern is considered the position of the object. Degree of match at a given position of the pattern is simply the fraction of pattern pixels that match their corresponding image pixel, thereby providing pattern inspection information.

Binary template matching does not depend on classifying image pixels as object or background, and so it can be applied to a much wider variety of problems than blob analysis. It also is much better able to tolerate missing or extra pattern features without severe loss of accuracy, and it is able to detect finer differences between the pattern and the object. One limitation, however, is that a binarization threshold is needed, which can be difficult to choose reliably in practice, particularly under conditions of poor signal-to-noise ratio or when illumination intensity or object contrast is subject to variation. Accuracy is typically limited to about one whole pixel due to the substantial loss of information associated with thresholding. Even more serious, however, is that binary template matching cannot measure object orientation and size. Furthermore, accuracy degrades rapidly with small variations in orientation and/or size, and if larger variations are expected the method cannot be used at all.

A significant improvement over binary template matching came with the advent of relatively inexpensive methods for the use of gray-level normalized correlation for pattern location and inspection. The methods are similar, except that no threshold is used so that the full range of image gray-levels are considered, and the degree of match becomes the correlation coefficient between the stored pattern and the image subset at a given position.

Since no binarization threshold is needed, and given the fundamental noise immunity of correlation, performance is not significantly compromised under conditions of poor signal-to-noise ratio or when illumination intensity or object contrast is subject to variation. Furthermore, since there is no loss of information due to thresholding, position accuracy down to about ¼ pixel is practical using well-known interpolation methods. The situation regarding orientation and size, however, is not much improved with respect to binary template matching. Another limitation is that in some applications, contrast can vary locally across an image of an object, resulting in poor correlation with the stored pattern, and consequent failure to correctly locate it.

More recently, improvements to gray-level correlation have been developed that allow it to be used in applications where significant variation in orientation and/or size is expected. In these methods, the stored pattern is rotated and/or scaled by digital image re-sampling methods before being matched against the image. By matching over a range of angles, sizes, and x-y positions, one can locate an object in the corresponding multidimensional space. Note that such methods would not work well with binary template matching, due the much more severe pixel quantization errors associated with binary images.

One problem with these methods is the severe computational cost, both of digital re-sampling and of searching a space with more than 2 dimensions. To manage this cost, the search methods break up the problem into two or more phases. The earliest phase uses a coarse, subsampled version of the pattern to cover the entire search space quickly and identify possible object locations in the n-dimensional space. Subsequent phases use finer versions of the pattern to refine the locations determined at earlier phases, and eliminate locations that the finer resolution reveals are not well correlated with the pattern. Note that variations of these coarse-fine methods have also been used with binary template matching and the original 2-dimensional correlation, but are even more important with the higher-dimensional search space.

The location accuracy of these methods is limited both by how finely the multidimensional space is searched, and by the ability of the discrete pixel grid to represent small changes in position, orientation, and scale. The fineness of the search can be chosen to suit a given application, but computational cost grows so rapidly with resolution and number of dimensions that practical applications often cannot tolerate the cost or time needed to achieve high accuracy. The limitations of the discrete pixel grid are more fundamental-no matter how finely the space is searched, for typical patterns one cannot expect position accuracy to be much better than about ¼ pixel, orientation better than a degree or so, and scale better than a percent or so.

A similar situation holds when gray-level pixel-grid-based methods are used for pattern inspection. Once the object has been located in the multidimensional space, pixels in the pattern can be compared to each corresponding pixel in the image to identify differences. Some differences, however, will result from the re-sampling process itself, because again the pixel grid cannot accurately represent small variations in orientation and scale. These differences are particularly severe in regions where image gray levels are changing rapidly, such as along object boundaries. Often these are the most important regions of an object to inspect. Since in general, differences due to re-sampling cannot be distinguished from those due to object defects, inspection performance is compromised.

SUMMARY OF THE INVENTION

In one general aspect, the invention is a method and apparatus for identifying differences between a stored pattern and a matching image subset, where variations in pattern position, orientation, and size do not give rise to false differences. The process of identifying differences is called inspection. Generally, an object image must be precisely located prior to inspection. In another general aspect, the invention is a system for analyzing an object image with respect to a model pattern, wherein the system includes extracting pattern features from the model pattern; generating a vector-valued function using the pattern features to provide a pattern field; extracting image features from the object image; evaluating each image feature, using the pattern field and an n-dimensional transformation that associates image features with pattern features, so as to determine at least one associated feature characteristic; and using at least one feature characteristic to identify at least one flaw in the object image. In a preferred embodiment, at least one associated feature characteristic includes a probability value that indicates the likelihood that an associated image feature does not correspond to a feature in the model pattern. In an alternate preferred embodiment, the at least one associated feature characteristic includes a probability value that indicates the likelihood that an associated image feature does correspond to a feature in the model pattern.

In another preferred embodiment, at least one pattern feature includes a probability value indicating the likelihood that the pattern feature does not correspond to at least one feature in the object image.

When using at least one feature characteristic, it is preferred to transfer a feature characteristic from the at least one image feature to an element of the pattern field, where in a preferred embodiment, the element of the pattern field is the nearest element of the pattern field.

When using at least one feature characteristic, it is also preferred to use a plurality of image features; and transfer a plurality of the feature characteristics from the plurality of image features to a plurality of elements of the pattern field, wherein some of the plurality of elements of the pattern field can include at least one link to a neighboring element of the pattern field. Further, after transferring a plurality of the feature characteristics from the plurality of image features to a plurality of elements of the pattern field, it is preferred that each element of the plurality of elements of the pattern field receive a feature characteristic equal to the maximum of its own feature characteristic and the feature characteristic of each neighboring element of the pattern field.

In another preferred embodiment, to use at least one feature characteristic includes identifying the nearest element of the pattern field; transferring a feature characteristic from the at least one image feature to the nearest element of the pattern field; and computing a coverage value using at least the transferred feature characteristic.

In a further preferred embodiment, evaluating each image feature includes comparing the direction of each image feature with the direction of an element of the pattern field. It is preferable to assign a higher weight to the image feature if the difference in the direction of the image feature from the direction of an element of the pattern field is less than a specified direction parameter. The specified direction parameter can be determined by a characteristic of the element of the pattern field, such as a flag indicating "corner" or "non-corner".

It is also possible for a lower weight to be assigned to the image feature if the difference in the direction of the image feature from the direction of an element of the pattern field is greater than a specified direction parameter, wherein the specified direction parameter can be determined by a characteristic of the element of the pattern field, such as a flag indicating "corner" or "non-corner".

In yet another preferred embodiment, to evaluate each image feature includes comparing modulo 180 degrees, the direction of each image feature with the direction of an element of the pattern field.

It is also possible that to evaluate each image feature includes assigning a weight of zero when the image feature is at a position that corresponds to an element of the pattern field that specified that no image feature is expected at that position.

Moreover, to evaluate each image feature can include comparing the distance of each image feature with a specified distance parameter, where a lower weight can be assigned to the image feature if the distance of the image feature is greater than a specified distance parameter, or alternatively, where a higher weight can be assigned to the image feature if the distance of the image feature is less than a specified distance parameter.

In another preferred embodiment, to evaluate each image feature includes comparing the direction of each image feature with the direction of an element of the pattern field, and comparing the distance of each image feature with a specified distance parameter.

To avoid ambiguity we will call the location of a pattern in a multidimensional space its pose. More precisely, a pose is a coordinate transform that maps points in an image to corresponding points in a stored pattern. In a preferred embodiment, a pose is a general six degree of freedom linear coordinate transform. The six degrees of freedom can be represented by the four elements of a 2×2 matrix, plus the two elements of a vector corresponding to the two translational degrees of freedom. Alternatively and equivalently, the four non-translational degrees of freedom can be represented in other ways, such as orientation, scale, aspect ratio, and skew, or x-scale, y-scale, x-axis-angle, and y-axis-angle.

The invention can serve as a replacement for the fine resolution phase of any coarse-fine method for pattern inspection, such as the prior art method of correlation search followed by Golden Template Analysis. In combination with the coarse location phases of any such method, the invention results in an overall method for pattern inspection that is faster and more accurate than any known prior art method.

In a preferred embodiment, the PatQuick™ tool, sold by Cognex Corporation, Natick Mass., is used for producing an approximate object pose.

The invention uses a stored pattern that represents an ideal example of the object to be found and inspected. The pattern can be created from a training image or synthesized from a geometric description. According to the invention, patterns and images are represented by a feature-based description that can be translated, rotated, and scaled to arbitrary precision much faster than digital image re-sampling, and without pixel grid quantization errors. Thus accuracy is not limited by the ability of a grid to represent small changes in position, orientation, or size (or other degrees of freedom). Furthermore, pixel quantization errors due to digital re-sampling will not cause false differences between the pattern and image that can limit inspection performance, since no re-sampling is done.

Accuracy is also not limited by the fineness with which the space is searched, because the invention does not test discrete positions within the space to determine the pose with the highest degree of match. Instead the invention determines an accurate object pose from an approximate starting pose in a small, fixed number of increments that is independent of the number of dimensions of the space (i.e. degrees of freedom) and independent of the distance between the starting and final poses, as long as the starting pose is within some "capture range" of the true pose. Thus one does not need to sacrifice accuracy in order to keep execution time within the bounds allowed by practical applications.

Unlike prior art methods where execution time grows rapidly with number of degrees of freedom, with the method of the invention execution time grows at worst very slowly, and in some embodiments not at all. Thus one need not sacrifice degree of freedom measurements in order to keep execution time within practical bounds. Furthermore, allowing four or more degrees of freedom to be refined will often result in better matches between the pattern and image, and thereby improved accuracy.

The invention processes images with a feature detector to generate a description that is not tied to a pixel grid. The description is a list of elements called dipoles (also called features) that represent points (positions) along object boundaries. A dipole includes the coordinates of the position of a point along an object boundary and a direction pointing substantially normal to the boundary at that point. Object boundaries are defined as places where image gradient (a vector describing rate and direction of gray-level change at each point in an image) reaches a local maximum. In a preferred embodiment, gradient is estimated at an adjustable spatial resolution. In another preferred embodiment, the dipole direction is the gradient direction. In another preferred embodiment, a dipole, i.e., a feature, contains additional information as further described in the drawings. In yet another preferred embodiment, dipoles are generated not from an image but from a geometric description of an object, such as might be found in a CAD system.

The stored model pattern to be used by the invention for localization and subsequent inspection is the basis for generating a dipole list that describes the objects to be found by representing object boundaries. The dipole list derived from the model pattern is called the field dipole list. It can be generated from a model training image containing an example object using a feature detector, or it can be synthesized from a geometric description. The field dipole list is used to generate a 2-dimensional vector-valued function called a field. For each point within the region of the stored model pattern, the field gives a vector that indicates the distance and direction to the nearest point along a model object boundary. The vector is called the force at the specified point within the stored model pattern.

Note that the nearest point along a model object boundary is not necessarily one of the model object boundary points represented by the field dipoles, but in general may lie between field dipole positions. Note further that the point within the stored model pattern is not necessarily an integer grid position, but is in general a real-valued position, known to within the limits of precision of the apparatus used to perform the calculations. Note that since the force vector points to the nearest boundary point, it must be normal to the boundary (except at discontinuities).

In a preferred embodiment, if no model object boundary point lies within a certain range of a field position, then a special code is given instead of a force vector. In another preferred embodiment, the identity of the nearest field dipole is given in addition to the force. In another preferred embodiment, one additional bit of information is given that indicates whether the gradient direction at the boundary pointed to by the force is the same or 180° opposite from the force direction (both are normal to the boundary). In another preferred embodiment, additional information is given as further described in the drawings. In another embodiment, the field takes a direction in addition to a position within the pattern, and the force returned is the distance and direction to the nearest model object boundary point in approximately the given direction.

The stored model pattern used by the invention includes the field dipole list, the field, and a set of operating parameters as appropriate to a given embodiment, and further described throughout the specification.

Given an object image and an approximate starting pose, pattern localization proceeds as follows. The object image is processed by a feature detector to produce a dipole list, called the image dipole list. The starting pose is refined in a sequence of incremental improvements called attraction steps. Each such step results in a significantly more accurate pose in all of the degrees of freedom that are allowed to vary. The sequence can be terminated after a fixed number of steps, and/or when no significant change in pose results from the last step, or based on any reasonable criteria. In a preferred embodiment, the sequence is terminated after four steps.

For each attraction step, the image dipoles are processed in any convenient order. The position and direction of each image dipole is mapped by the current pose transformation to convert image coordinates to model pattern (field) coordinates. The field is used to determine the force at the point to which the image dipole was mapped. Since each image dipole is presumed to be located on an object boundary, and the force gives the distance and direction to the nearest model object boundary of the stored model pattern, the existence of the image dipole at the mapped position is taken as evidence that the pose should be modified so that the image dipole moves in the force direction by an amount equal to the force distance.

It is important to note that object boundaries generally provide position information in a direction normal to the boundary, which as noted above is the force direction, but no information in a direction along the boundary. Thus the evidence provided by an image dipole constrains a single degree of freedom only, specifically position along the line of force, and provides no evidence in the direction normal to the force.

If the current pose is a fair approximation to the true object position, then many image dipoles will provide good evidence as to how the pose should be modified to bring the image boundaries into maximum agreement with the boundaries of the stored model pattern. For a variety of reasons, however, many other image dipoles may provide false or misleading evidence. Thus, it is important to evaluate the evidence provided by each image dipole, and assign a weighting factor to each image dipole to indicate the relative reliability of the evidence.

In one embodiment, the direction (as mapped to the pattern coordinate system) of an image dipole is compared with the force direction, and the result, modulo 180°, is used to determine the weight of the image dipole. If the directions agree to within some specified parameter, the dipole is given a high weight; if they disagree beyond some other specified parameter, the dipole is given zero weight; if the direction difference falls between the two parameters, intermediate weights are assigned.

In another embodiment, the image dipole direction is compared to the gradient direction of the model pattern boundary to which the force points. A parameter is used to choose between making the comparison modulo 180°, in which case gradient polarity is effectively ignored, or making it modulo 360°, in which case gradient polarity is considered. In a preferred embodiment, the field itself indicates at each point within the stored model pattern whether to ignore polarity, consider polarity, or defer the decision to a global parameter.

In one embodiment, the force distance is used to determine the dipole weight. In a preferred embodiment, if the force distance is larger than some specified parameter, the dipole is given zero weight, on the assumption that the dipole is too far away to represent valid evidence. If the force distance is smaller than some other specified parameter, the dipole is given a high weight, and if it falls between the two parameters, intermediate weights are assigned.

In a preferred embodiment, the parameters specifying the weight factor as a function of force distance are adjusted for each attraction step to account for the fact that the pose is becoming more accurate, and therefore that one should expect image dipoles representing valid evidence to be closer to the pattern boundaries.

In one embodiment, the gradient magnitude of the image dipoles is used to determine the dipole weight. In a preferred embodiment, a combination of dipole direction, force distance, and gradient magnitude is used to determine the weight.

For each attraction step, the invention determines a new pose that best accounts for the evidence contributed by each image dipole, and taking into account the dipole's weight. In a preferred embodiment, a least-squares method is used to determine the new pose.

The evaluation of each image dipole to produce a weight can also provide information for inspection purposes. It is desirable to look for two distinct kinds of errors: missing features, which are pattern features for which no corresponding image feature can be found, and extra features, sometimes called "clutter", which are image features that correspond to no pattern feature. In one embodiment, image dipoles with low weights are considered to be clutter. In a preferred embodiment, a specific clutter value is computed for each image dipole, as further described in the drawings below.

In an embodiment of the invention that can identify missing pattern features, the field at each point gives identity of the nearest field dipole, if any, in addition to the force vector. Each field dipole contains an evaluation, which is initialized to zero. Each image dipole transfers its evaluation (also called "weight" or "feature characteristic") to that of the nearest field dipole as indicated by the field. Since in general the correspondence between image and field dipoles is not one-to-one, some field dipoles may receive evaluations (feature characteristics) from more than one image dipole, and others may receive evaluations from none. Those field dipoles that receive no evaluation may represent truly missing features, or may simply represent gaps in the transfer due to quantization effects.

When more than one evaluation is transferred to a given field dipole, the evaluations can be combined by any reasonable means. In a preferred embodiment, the largest such evaluation is used and the others are discarded. Gaps in the transfer can be closed by considering neighboring field dipoles. In one embodiment, methods known in the art as gray-level mathematical morphology are used to close the gaps. In the case of the invention, one-dimensional versions of morphological operations are used, since field dipoles lie along one-dimensional boundaries. In a preferred embodiment, a morphological dilation operation is used.

If the starting pose is too far away from the true pose, there may be insufficient good evidence from the image dipoles to move the pose in the right direction. The set of starting poses that result in attraction to the true pose defines the capture range of the pattern. The capture range depends on the specific pattern in use, and determines the accuracy needed from whatever method is used to determine the starting pose.

In a preferred embodiment, the feature detector that is used to generate dipoles is tunable over a wide range of spatial frequencies. If the feature detector is set to detect very fine features at a relatively high resolution, the accuracy will be high but the capture range will be relatively small. If on the other hand the feature detector is set to detect coarse features at a relatively lower resolution, the accuracy will be lower but the capture range will be relatively large. This suggests a multi-resolution method where a coarse, low resolution step is followed by a fine, high resolution step. With this method, the capture range is determined by the coarse step and is relatively large, while the accuracy is determined by the fine step and is high.

BRIEF DESCRIPTION OF THE DRAWING

The invention will be more fully understood from the following detailed description, in conjunction with the following figures, wherein:

FIGS. 9A, 9B, and 9C illustrate part of the analysis that is performed by the propagate phase of the field generation module of FIG. 2;

DETAILED DESCRIPTION OF THE PREFERRED EMBODIMENTS

Figure 1:
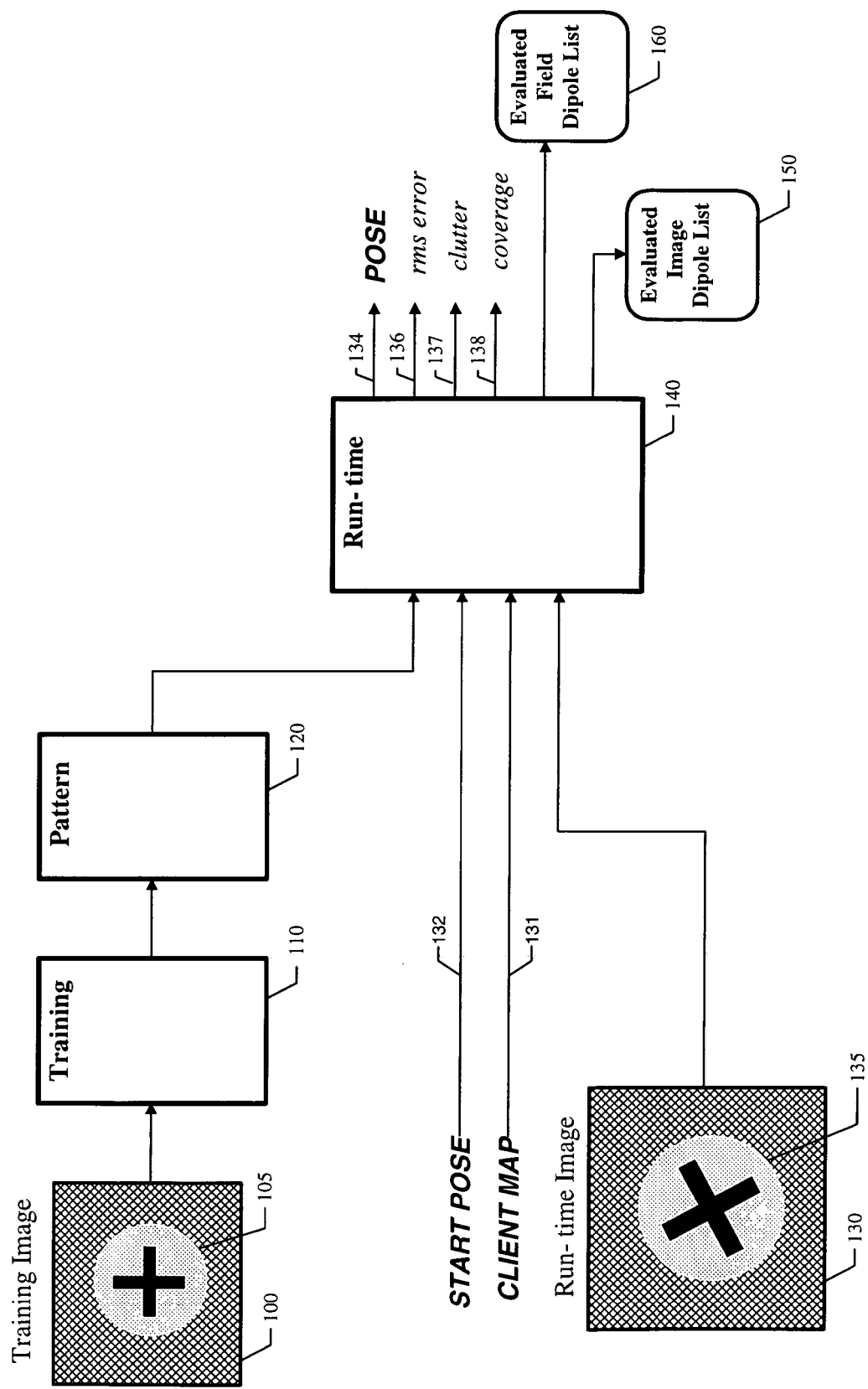
FIG. 1 is a high-level block diagram of an embodiment of the invention.

In the following figures, "modules" can be implemented as software, firmware, or hardware. Moreover, each module may include sub-modules, or "steps", each of which can be implemented as either hardware, software, or some combination thereof. FIG. 1 is a high-level block diagram of one embodiment of the invention. A training (model) image 100 containing an example of a pattern 105 to be used for localization and/or inspection is presented. A training module 110 analyzes the training image and produces a stored model pattern 120 for subsequent use. At least one run-time image 130 is presented, each such image containing zero or more instances of patterns 135 similar in shape, but possibly different in size and orientation, to the training (model) pattern 105.

Figure 1A:
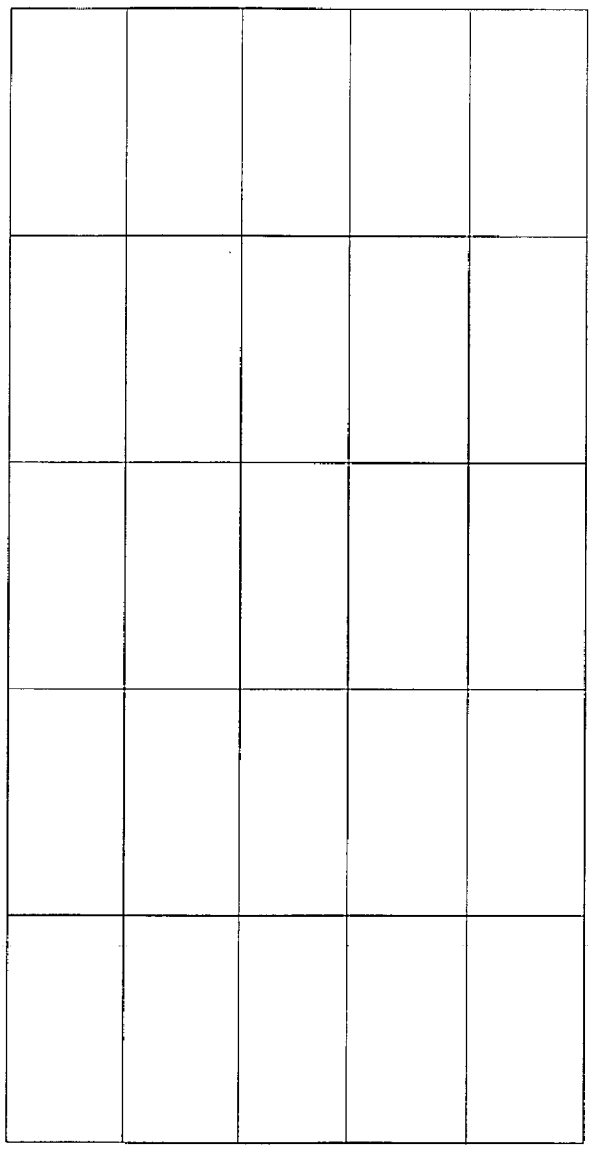
FIG. 1A is an illustration of a pixel array having a 2:1 aspect ratio.

Each run-time image 130 has an associated client map 131, chosen by a user for a particular application. A client map is a coordinate transformation that maps, i.e., associates points in an orthonormal but otherwise arbitrary coordinate system to points in the image. An orthonormal coordinate system has perpendicular axes, each axis having a unit scale. The client map provides an orthonormal reference that is necessary to properly handle the orientation degree of freedom, as well as the skew, scale, and aspect ratio degrees of freedom. In practical applications, the images themselves are almost never orthonormal, since practical image sensors almost never have perfectly square pixels. For example, pixels having an aspect ration of 2:1 are possible, as shown in FIG. 1A. In this case, the client map would be a 2×2 matrix:

| 0.5 | 0.0 |
|-----|-----|
| 0.0 | 1.0 |

If the pixels are square, the client map is the identity transform, i.e., each diagonal entry in the transform matrix is 1.0, and each off-diagonal element is 0.0.

Furthermore, it is sometimes useful to have a significantly non-orthonormal field. For example, a field generated from a square pattern can be used to localize and inspect a rectangular or even parallelogram-shaped instance of the pattern by using an appropriate starting pose. These cases can only be handled if an orthonormal reference is available.

For each run-time image, a starting pose 132 is determined by any suitable method, such as coarse gray-level correlation with orientation and size re-sampling, a coarse generalized Hough transform, or the Cognex PatQuick™ tool. The starting pose 132 is a six-degree-of-freedom coordinate transformation that maps points in the pattern 105 to approximately corresponding points 135 in the run-time image 130. A run-time module 140 analyzes the image 130, using the stored pattern 120, the starting pose 132, and the client map 131. As a result of the analysis, the run-time module 140 produces a pose 134 that maps pattern points 105 to accurately corresponding image points 135.

The run-time module 140 produces an rms error value 136 that is a measure of the degree of match between the pattern 105 and the image 130. The rms error value 136 is the root-mean-square error from the least squares solution, or other error minimization solution, that is used to determine a pose that best fits the evidence of the image dipoles, to be described in more detail below. A value of zero represents a perfect fit, while higher values represent poorer fits.

The run-time module 140 produces a coverage value 138 that is a measure of the fraction of the pattern 105 to which corresponding image features have been found. The coverage value 138 is computed by summing the field dipole evaluations and dividing by the number of field dipoles, to be described in more detail below.

The run-time module 140 produces a clutter value that is a measure of extra features found in the image that do not correspond to pattern features. In a preferred embodiment, the clutter value is computed by summing the individual image dipole clutter values and dividing by the number of field dipoles.

The run-time module 140 produces an evaluated image dipole list 150 and an evaluated field dipole list 160. The evaluated image dipole list 150 identifies features in the image 130 not present in the pattern 105, and the evaluated field dipole list 160 identifies features in the pattern 105 not present in the image 130. The differences between the image and pattern so identified can be used for inspection purposes.

Figure 2:
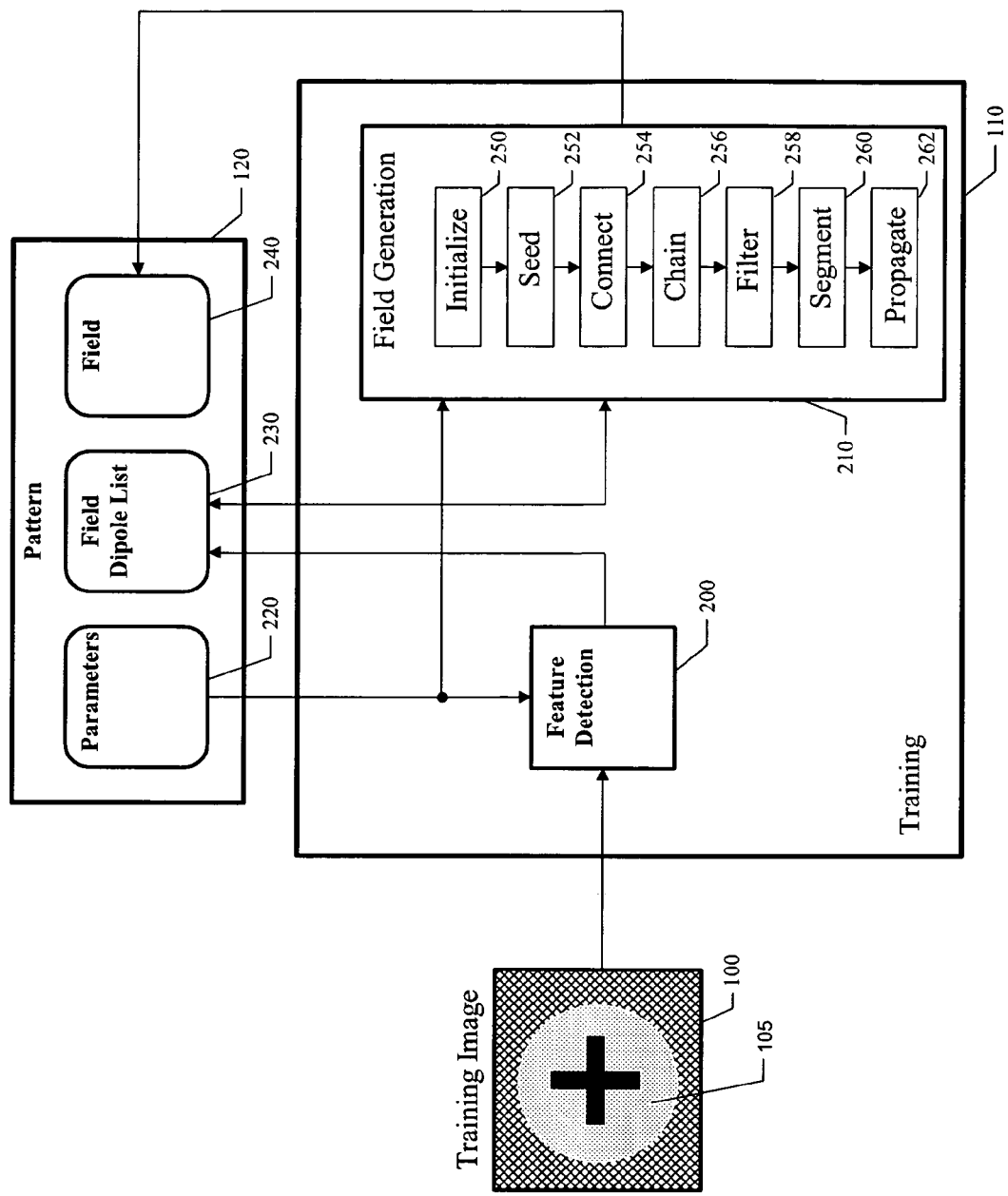
FIG. 2 is a block diagram of the training block of FIG. 1.

FIG. 2 shows a block diagram of the training module 110 and pattern-related data 120. A training image 100 containing an example of a pattern 105 to be localized and/or inspected is presented to training module 110, which analyzes the training image 100 and produces a stored pattern 120 for subsequent use. The training module 110 consists of two modules, a feature detection module 200 and a field generation module 210. Both modules use various parameters 220 to control operation as appropriate for the application. These parameters, as well as those needed for subsequent run-time modules, are pattern-dependent and therefore are collected and stored in the pattern 120 as shown.

The feature detection module 200 processes the training image 100, and using the parameters 220, to produce a field dipole set 230, which is stored in the pattern 120 as shown. The field generation module 210 uses the field dipole set 230 and parameters 220 to produce a field 240, stored in the pattern 120 as shown.

As described in the summary above, the field 240 produces information as a function of theoretically real-valued position within the region of the pattern 105. In practice, since all the field values cannot be computed analytically and stored, a 2-dimensional array is used that stores field values at discrete points on a grid. Given a real-valued position (to some precision determined by the particular details of the embodiment), an interpolation method, such as the method shown in FIG. 17, is used to compute field values at intermediate points between grid elements. Since the field grid is never translated, rotated, or scaled, no re-sampling is needed and grid quantization effects are small. Instead, the image dipoles, which are not grid-based, are mapped to the fixed field coordinates in accordance with the map of FIG. 16.

Thus the purpose of the field generation module 210 is to compute the elements of the 2-dimensional array that encodes the field 240. The field generation module 210 is itself composed of many steps or submodules, as shown in FIG. 2. Each of these steps modifies the field in some way, generally based on the results of the previous steps. Some of the steps also add information to the field dipole set 230. The specific sequence of steps shown in FIG. 2 corresponds to a preferred embodiment; many other variations are possible within the spirit of the invention; the essential requirement is that the stored pattern 120 be able to provide certain information as a function of position within the region of the pattern 105.

In a preferred embodiment as shown in FIG. 2, the field generation module 210 consists of the following steps. An initialization step 250 loads predefined codes into the field array elements 520, 540, shown in FIG. 5. A seed step 252 sets up field array elements at positions corresponding to the dipoles in the field dipole set 230. A connect step 254 uses the seeded field array to identify neighboring dipoles for each field dipole. Once identified, the field dipoles are connected to neighboring ones to form chains by storing the identity of left and right neighbors along pattern boundaries, if any. A chain step 256 scans the connected field dipoles to identify and catalog discrete chains. For each chain, the starting and ending dipoles, length, total gradient magnitude, and whether the chain is open or closed is determined and stored.

A filter step 258 removes weak chains from the pattern by removing the dipoles they contain from the field array (i.e. reversing the seeding step 252 for those dipoles). A variety of criteria can be used to identify weak chains. In a preferred embodiment, chains whose total gradient magnitude or average gradient magnitude are below some specified parameter are considered weak.

A segment step 260 divides chains into segments of low curvature, separated by zones of high curvature called corners. Corner dipoles are marked in the field array for use as described in subsequent figures. Curvature can be determined by a variety of methods; in a preferred embodiment, a dipole is considered a corner if its direction differs from that of either neighbor by more than some specified parameter, e.g., as further described in conjunction with FIG. 8.

A sequence of zero or more propagate steps 262 extend the field out from the seeded positions. The result is that force vectors pointing to pattern boundaries, as well as other information needed by the run-time steps, can be obtained at some distance from the boundaries. The number of propagate steps 262 is controlled by a parameter and determines the distance from pattern boundaries that the field will contain valid force vectors, as well as the computation time needed for pattern training. In a preferred embodiment, four propagation steps are used. Field elements beyond the range of propagation will contain the code set during the initialization step 250.

Figure 3:
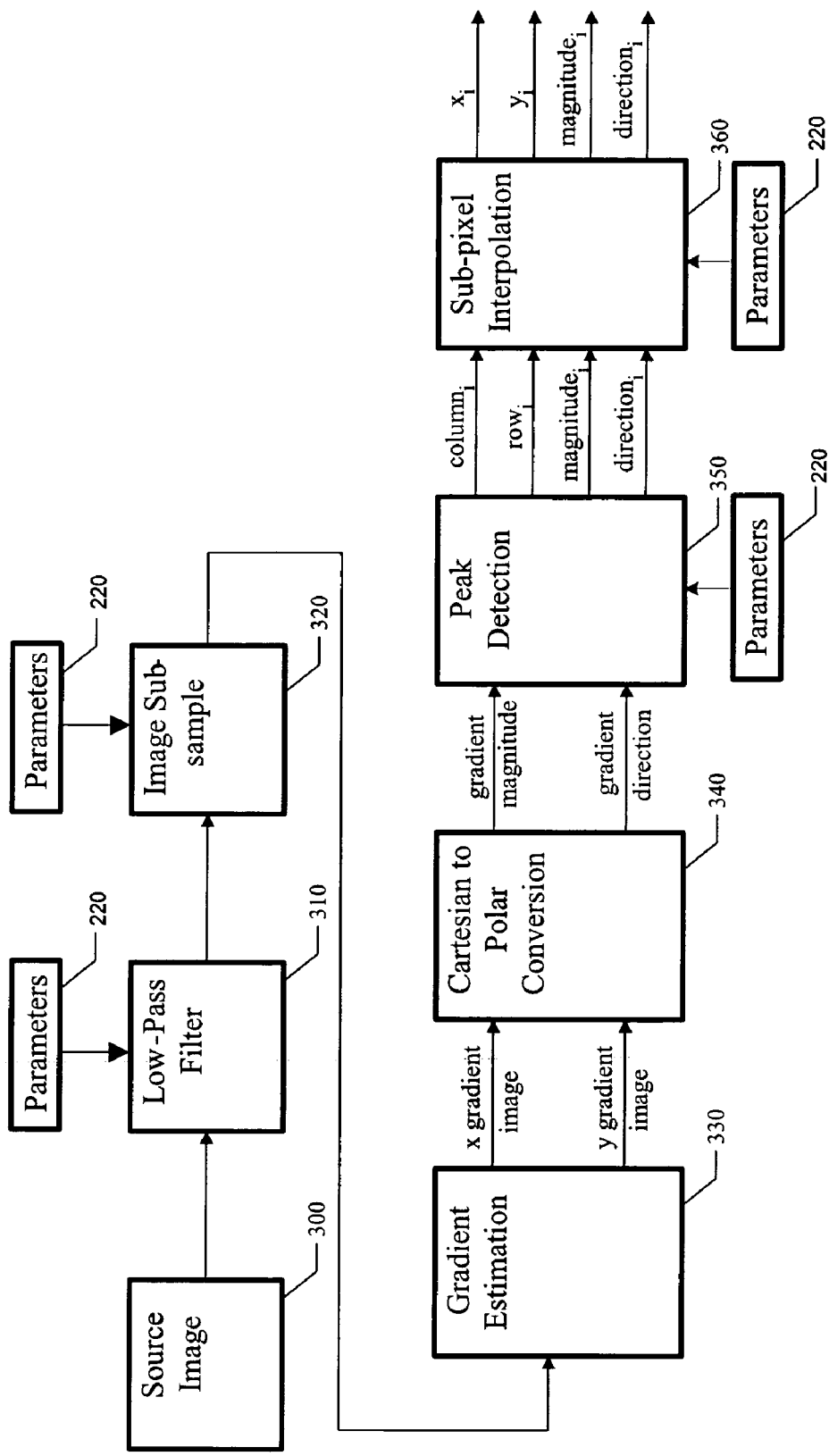
FIG. 3 is a block diagram of the feature detection block of FIG. 2.

FIG. 3 shows a preferred embodiment of a feature detector to be used for practice of the invention. The feature detector processes a source image 300, which can be either a training image or a run-time image. A low-pass filter 310 and image sub-sampler 320 are used to attenuate fine detail in the source image that for a variety of reasons we wish to ignore. For example we may wish to attenuate noise or fine texture, or we may wish to expand the capture range of the pattern by focusing on coarse pattern features. Also, we may wish to decrease the number of image dipoles, thereby reducing processing time.

The response of the filter 310 and sub-sampler 320 are controlled by parameters 220 stored in the pattern (not shown in this figure). One setting of the parameters effectively disables the filter and sub-sampler, allowing the source image 300 to pass without modification for maximum resolution.

Methods for low-pass filtering and sub-sampling of digital images are well known in the art. In a preferred embodiment, a constant-time second-order approximately Gaussian filter is used, as described in [U.S. patent pending "Efficient, Flexible Digital Filtering"].

The filtered, sub-sampled image is processed by a gradient estimation module 330 to produce an estimate of the x (horizontal) and y (vertical) components of image gradient at each pixel. A Cartesian-to-polar conversion module 340 converts the x and y components of gradient to magnitude and direction. A peak detection module 350 identifies points where the gradient magnitude exceeds a noise threshold and is a local maximum along a 1-dimensional profile that lies in approximately the gradient direction, and produces a list of the grid coordinates (row and column number), gradient magnitude, and gradient direction for each such point.

A sub-pixel interpolation module 360 interpolates the position of maximum gradient magnitude along said 1-dimensional profile to determine real-valued (to some precision) coordinates ($x_i$, $y_i$) of the point. The result is a list of points that lie along boundaries in the image, which includes the coordinates, direction, and magnitude of each point. This list can be used as the basis for either a field or image dipole list, to which additional information may be added as appropriate.

Methods for identifying points along image boundaries are well-known in the art. Any such method can be used for practice of the invention, whether based on gradient estimation or other techniques. Methods for gradient estimation, Cartesian-to-polar conversion, peak detection, and interpolation are also well-known. In a preferred embodiment, the methods described in [U.S. patent pending "Method and Apparatus for Fast, Inexpensive, Subpixel Edge Detection"] are used.

In a preferred embodiment, the source image has eight bits of gray-scale per pixel. The low-pass filter produces a 16-bit image, taking advantage of the inherent noise-reduction properties of a low-pass filter. The gradient estimation module uses the well-known Sobel kernels and operates on either a 16-bit filtered image, if the parameters are set so as to enable the filter 310, or an 8-bit unfiltered image if the parameters are set so as to disable the filter 310. The x and y components of gradient are always calculated to 16 bits to avoid loss of precision, and the gradient magnitude and direction are calculated to at least six bits preferably using the well-known CORDIC algorithm.

Several parameter values are needed for feature extraction, both in the training module 110 and in the run-time module 140. Generally these parameters include those controlling the response of the low-pass filter 310, the sub-sampling amount used by sub-sampler 320, and the noise threshold used by peak detector 350. Other values may be needed depending on the exact details of the feature extractor used to practice the invention.

Appropriate settings for the parameter values depend on the nature of the patterns and images to be analyzed. In a preferred embodiment certain defaults are used that work well in many cases, but in general no rules can be given that work well in all cases. Said preferred embodiment is further described below in conjunction with FIG. 26.

Figure 4:
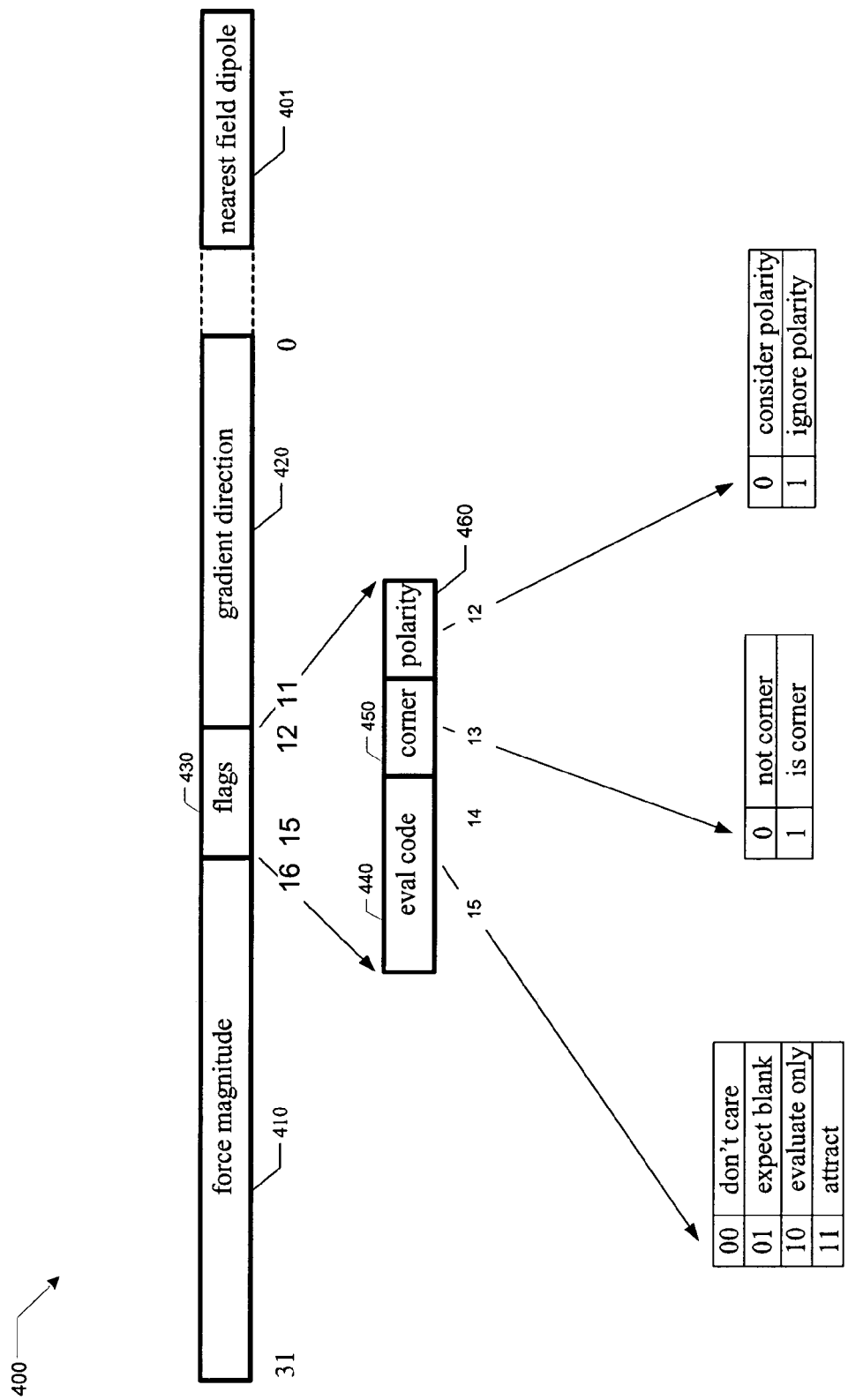
FIG. 4 is a diagram showing bit assignments of a 32-bit word, and optional 'nearest dipole' bits.

FIG. 4 shows an element of the field array as used in a preferred embodiment of the invention. Information is packed into a 32-bit word 400, both to conserve memory and to speed up access on conventional computers by maximizing the number of elements that will fit in data cache and using a word size that keeps all elements properly aligned on appropriate address boundaries. Fixed point representations are used for the force vector, both because they are more compact than floating point representations and to allow best use to be made of the signal processing capabilities of modern processors such as the Texas Instruments TMS320C80 and the Intel Pentium-MMX.

In a preferred embodiment, a field element stores a force vector that gives the distance and direction to the nearest point along a pattern boundary, and one bit that specifies whether the gradient direction at that boundary point is in the same, or 180° opposite, direction as the force vector. This is accomplished as shown in FIG. 4 by storing a signed force magnitude 410 and a gradient direction 420. If the force direction is the same as the gradient direction, the force magnitude 410 will be positive; if the force direction is opposite from the gradient direction, the force magnitude 410 will be negative.

The magnitude/direction representation for the force vector is preferred over an x-y component representation because it is necessary to be able to represent vectors that have zero length but a well-defined direction. Such vectors are called pseudo-null vectors. The equivalent x-y components can be calculated by the well-known formula $$\begin{pmatrix} \text{force}_x \\ \text{force}_y \end{pmatrix} = \text{magnitude} \begin{pmatrix} \cos(\text{direction}) \\ \sin(\text{direction}) \end{pmatrix}$$

Note that gradient direction can be used in the above formula, since the stored magnitude is negative if the force direction is opposite the gradient direction.

In the preferred embodiment shown, the force magnitude 410 is in units of field grid increments, using a two's complement representation of 16 total bits, of which the least significant 11 are to the right of the binary point and the most significant is the sign bit. Thus the maximum force vector length is just under 16 field grid units, and the resolution is $1/2048^{th}$ of a rid unit.

The gradient direction 420 is preferably represented as a 12-bit binary angle in the range 0° to 360°, with a resolution of 360°/4096=0.088°. In other embodiments, the bits of field element 400 are divided between force 410 and direction 420 to provide greater or lesser precision and range, as needed for each particular application.

A 4-bit flags element 430 is also stored in the field element 400. An 2-bit eval code 440 determines how an image dipole is to be evaluated if the current pose maps it to a field position within the region covered by this element 400. The don't care code specifies that the image dipole should be ignored. The expect blank code specifies that no features are expected in this region of the pattern, and so if any image dipoles map here they should be given a low evaluation for inspection purposes, should be given a high clutter rating, and should not be used as evidence for localization. The evaluate only code specifies that the image dipole should be evaluated by the usual criteria for inspection purposes, but should not contribute evidence for localization purposes. The attract code specifies that the image dipole should be evaluated and used both for localization and inspection.

If the eval code 440 is either "don't care" or "expect blank", the force vector is undefined and is said to be invalid. If the eval code is "evaluate only" or "attract", the force vector is said to be valid.

A 1-bit corner code 450 specifies whether or not the pattern boundary point pointed to by the force vector is in a high-curvature zone ("is corner") or a low-curvature segment ("not corner"). If the force vector is invalid, the corner code is set to "not corner".

A 1-bit polarity code 460 specifies whether the image dipole evaluation should consider or ignore gradient direction, as described above in the summary section and further described below. A parameter is used to specify whether or not to override the polarity flags stored in the field element 400, and if so, whether to force polarity to be considered or ignored.

In a preferred embodiment, the field element 400 also specifies the identity of the nearest field dipole 401 in addition to the force vector 400. The identity 401 can be represented as a index into the field dipole list. In a preferred embodiment, a 16-bit index is used, which is stored in a separate array so as to satisfy data alignment guidelines of conventional computers.

Figure 5:
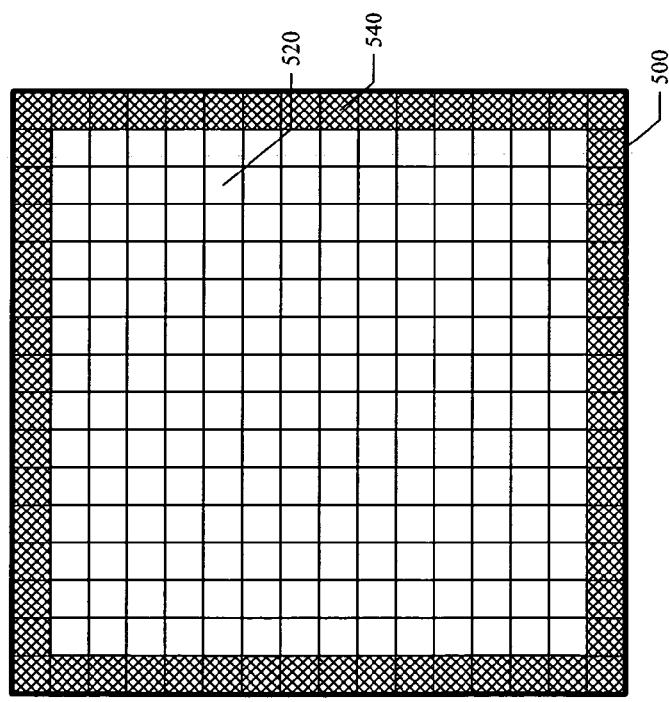
FIG. 5 is an illustration of a field element array, including a border of field elements.

FIG. 5 shows details of the initialization step 250 of the field generation step 210. A 2-dimensional array 500 of field elements 400 is used. Any reasonable grid spacing can be used; in a preferred embodiment, the grid spacing is the same as that of the image that is input to the gradient estimation module 330 of the feature detector 200.

Field elements 520, (indicated as white in FIG. 5 and having the same structure as field element 400) cover the region of the training pattern 105, together forming a "training region". The field elements 520 are initialized so that the eval code 440 is set to "expect blank". As described above, in this state the force vector is considered invalid and need not be initialized. In one embodiment, however, further described below in conjunction with FIG. 20b, the gradient direction field 420 of these field elements 520 are set equal to the corresponding gradient directions of the training image. A border of additional field elements 540, (indicated as gray in FIG. 5 and having the same structure as field element 400) are initialized so that the eval code 440 is set to "don't care". This reflects the fact that in general we don't know what features might lie beyond the bounds of the training region. These "don't care" values will be replicated inwards during each propagation step 262, so that image features lying just outside the training pattern 105 don't attract to pattern features just inside.

A separate corresponding array of field dipole indices 401, identical in size to the white-shaded field elements 520, is also used, but need not be initialized. The values in this array are considered valid only if the force vector of the corresponding field element of array 500 is valid.

Figure 6:
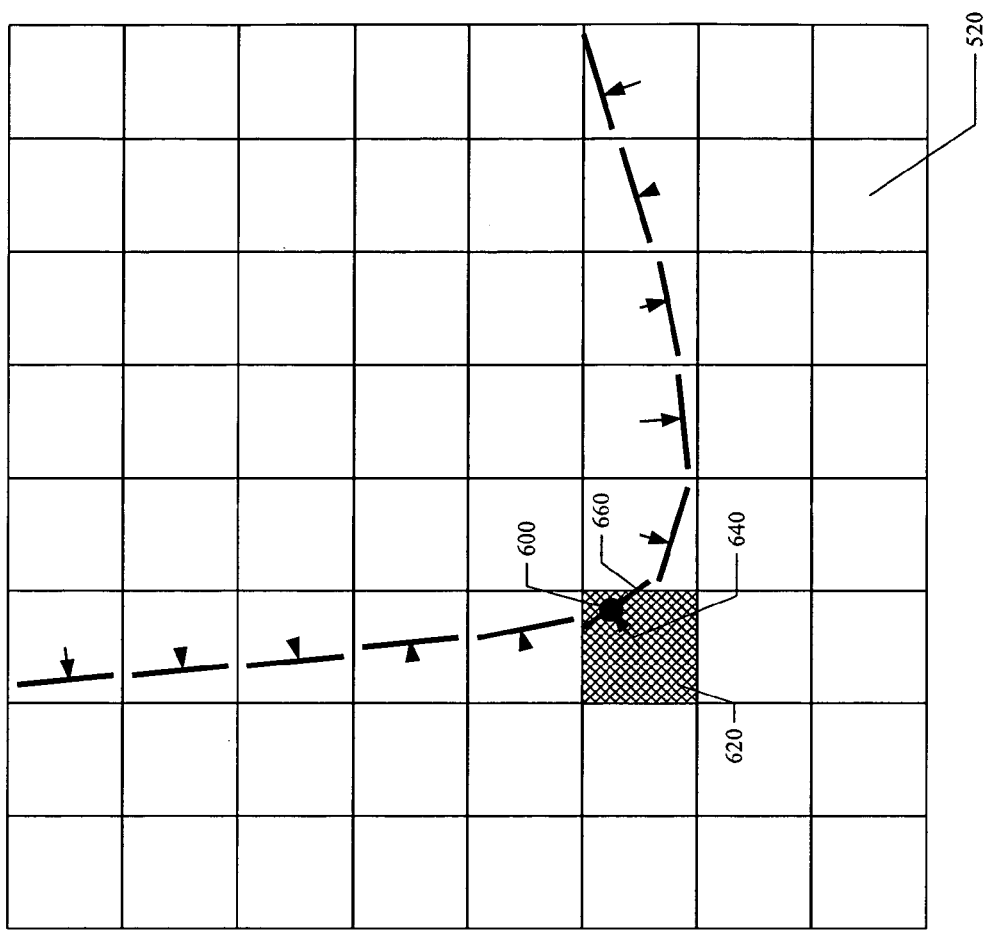
FIG. 6 illustrates field seeding, showing some of the field elements of FIG. 5, including a plurality of straight line segments of a pattern boundary, and the associated field dipoles.

FIG. 6 shows details of the seed step 252 of the field Generation module 210. Shown is a subset of the field elements 520 of the field array 500. Each field dipole is located within some field element. For example, the field dipole at point 600 falls within field element 620, indicated as gray in FIG. 6. Also shown is a small straight-line section of pattern boundary 660 corresponding to the example field dipole at point 600. This section of boundary is shown primarily to aid in understanding the figure. Its orientation, and position along a line normal to its orientation, are significant, but its length is essentially arbitrary.

The field element 620 is set to have force vector 640. The force vector points from the center of element 620 to a point on boundary section 660 and either in the direction, or opposite to the direction of the dipole (i.e. normal to the boundary), whichever is required to bring the head of the vector to the boundary 660. In the example shown, the point on the boundary to which the vector points is coincident with the dipole position 600, but in general it need not be. FIG. 6 shows several other examples of seeded force vectors.

It also may happen that a field dipole's position falls exactly at the center of a field element, so that the length of the force vector is zero. In this case the force vector is pseudo-null—its direction is well-defined and must be set properly.

In a preferred embodiment, for each field element that receives a seed force vector, the eval code is set to "attract", the corner code is set to "no corner", and the polarity code is set to "consider polarity". Other schemes may be devised within the spirit of the invention to suit specific applications.

For each field element that receives a seed force vector, the corresponding element 401 of the array of field dipole indices is set to identify the field dipole used to seed the field element.

In a preferred embodiment using the feature detector of FIG. 3, as further described in [U.S. patent pending "Method and Apparatus for Fast, Inexpensive, Subpixel Edge Detection"], and where the field grid has the same geometry as the image that is input to the gradient estimation module 330, no more than one field dipole will fall within any given field element, and there will be no gaps in the boundary due to grid quantization effects. In a less preferred embodiment using different methods for feature detection, various schemes can be used to handle multiple dipoles that fall within a given field element, or gaps in the boundary due to quantization effects. The preferred method for multiple dipoles within one field element is to choose the one whose force vector is shortest, and discard the others. The preferred method for gaps in the boundary is to do nothing and let the propagation steps fill in the gaps.

Figure 7B:
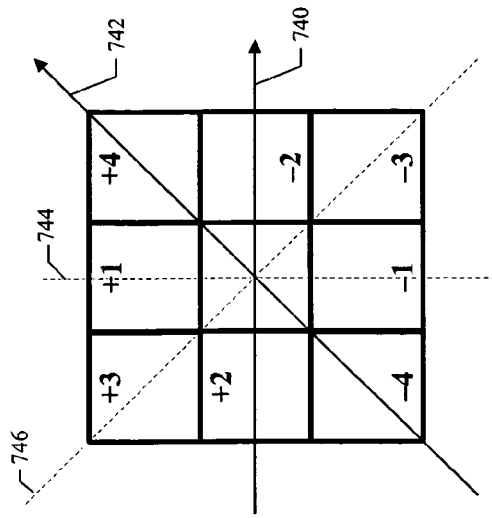
FIGS. 7B and 7C are diagrams illustrating the order in which neighboring field elements are examined.
Figure 7C:
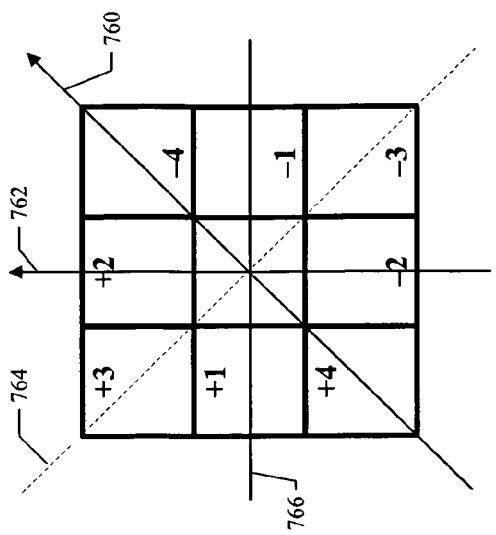
Figure 7A:
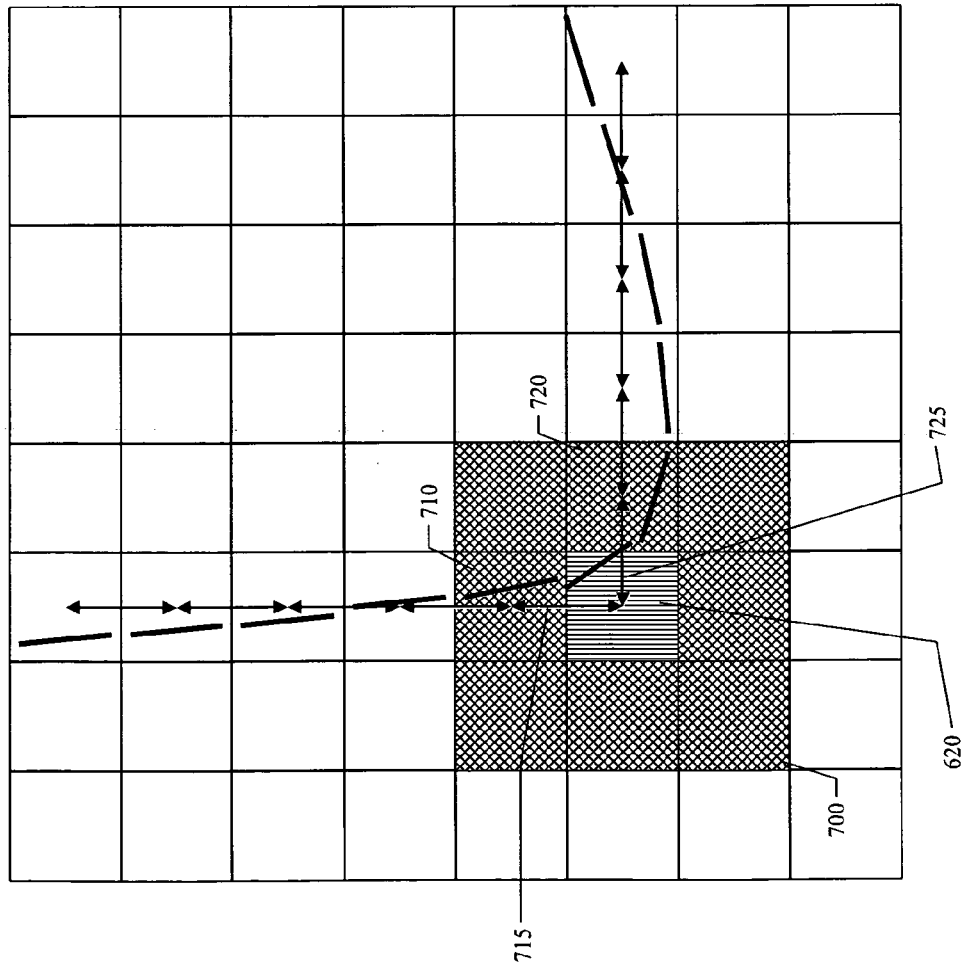
FIG. 7A illustrates field dipole connecting, showing some of the field elements of FIG. 6, including a plurality of straight line segments of a pattern boundary, and a plurality of associated right and left links.

FIG. 7 shows details of the connect step 254 of the field generation module 210. FIG. 7a shows the same subset of field elements 520 of the field array 500 as was shown in FIG. 6. Also shown is the example field element 620, indicated as light gray.

For every field dipole, the seeded field is examined to identify neighboring positions that contain dipoles to which the dipole should be connected. For the example field element 620, the neighboring positions 700 are shown, shaded medium gray. The neighboring positions 700 are examined in two steps of four neighboring positions each, each step in a particular order, determined by the direction of the field dipole corresponding to field element 620.

In one step, a left neighbor field element 710 is identified, and a left link 715 is stored in the field dipole corresponding to field element 620 identifying the field dipole corresponding to field element 710 as its left neighbor. In the other step, a right neighbor field element 720 is identified, and a right link 725 is stored to identify the field dipole's right neighbor. If a given neighbor cannot be found, a null link is stored. Note that "left" and "right" are defined arbitrarily but consistently by an imaginary observer looking along the dipole gradient direction.

FIG. 7b shows the order in which neighboring field elements are examined for a dipole whose direction falls between arrows 740 and 742, corresponding to a pattern boundary that falls between dotted lines 744 and 746. The sequence for identifying the left neighbor is +1, +2, +3, and +4. The first neighbor in said sequence that contains a dipole (seeded Field element), if any, is the left neighbor. Similarly, the sequence for identifying the right neighbor is −1, −2, −3, and −4.

FIG. 7c shows another example, where the dipole direction falls between arrows 760 and 762, corresponding to a pattern boundary that falls between dotted lines 764 and 766. The sequences of neighbors are as shown. The sequences for all other dipole directions are simply rotations of the two cases of FIGS. 7b and 7c.

Note that the sequences given in FIGS. 7b and 7c show a preference for orthogonal neighbors over diagonal neighbors, even when diagonal neighbors are "closer" to the direction of the pattern boundary. This preference insures that the chains will properly follow a stair-step pattern for boundaries not aligned with the grid axes. Clearly this preference is somewhat dependent on the specific details of how the feature detector chooses points along the boundary.

Once connections have been established for all field dipoles, a consistency check is performed. Specifically, the right neighbor of a dipole's left neighbor should be the dipole itself, and the left neighbor of a dipole's right neighbor should also be the dipole itself. If any links are found for which these conditions do not hold, the links are broken by replacing them with a null link. At the end of the connect step, only consistent chains remain.

Many alternate methods can be used to connect dipoles within the spirit and scope of the invention. In some embodiments, particularly where no inspection is to be performed, the connect 254 is omitted entirely.

Figure 8:
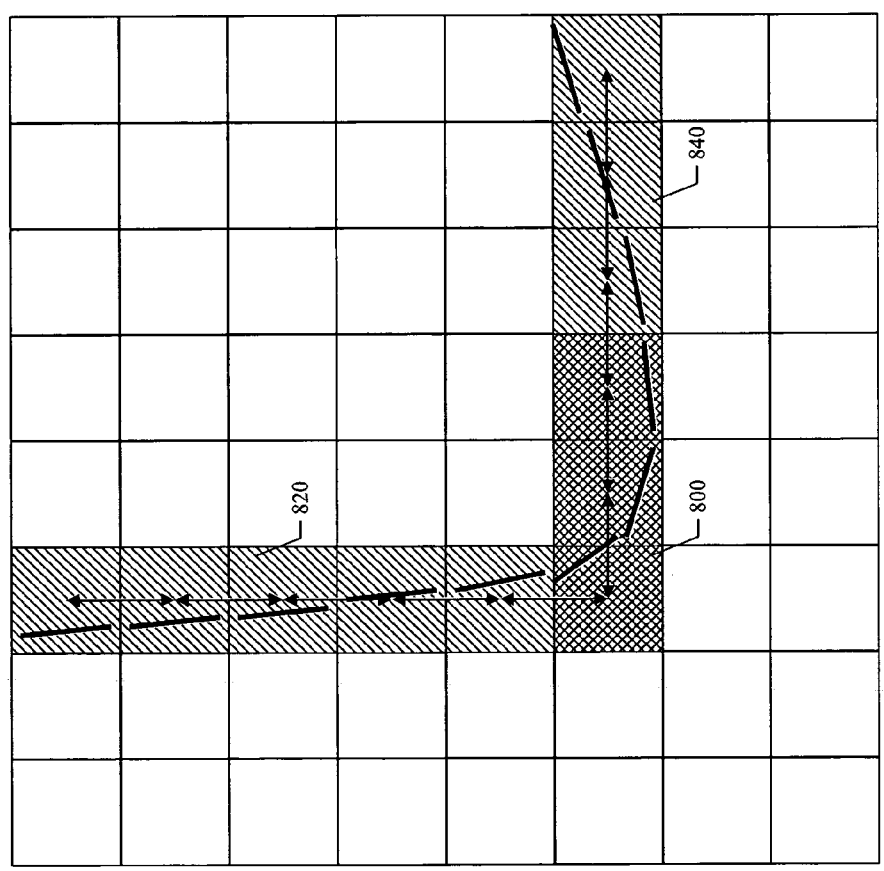
FIG. 8 illustrates chain segmentation of FIG. 2, showing some of the field elements of FIG. 5, including a plurality of straight line segments, and a plurality of left and right links.

FIG. 8 shows details of the segment step 260 of the field generation step 210. Field elements 800 shaded medium gray are identified as "corners" because the dipole directions differs from that of their left and/or right neighbors by more than some specified parameter. In a preferred embodiment, the parameter is 16.875 degrees. For these elements the corner code 450 is set to "is corner". Other field elements 820, shaded light gray, lie along one chain segment, while field elements 840, also shaded light gray, lie along another chain segment. For these elements it is not necessary to set the corner code, because it was set to "no corner" when the field was seeded.

FIG. 9 shows examples of part of the analysis that is performed by the propagate step 262 of the field generation step 210. In the example of FIG. 9a, field element 900 initially does not have a valid force vector; its eval code is "expect blank", as set by the initialization step 250. Neighboring element 902 has a valid force vector 904, which points to a segment of pattern boundary 906 that is assumed to be an approximately straight line.

A vector 908 is constructed from the center 916 of element 900 to the center of the neighbor 902. The projection 910 of vector 908 onto force vector 904 is constructed. A new force vector 912 is constructed from the center 916 of Field element 900 to the boundary 906 by adding the neighbor's force vector 904 to the projection 910. An offset value is computed whose magnitude is equal to the length 914 of the difference between vector 908 and projection 910, and whose sign is determined by the direction 918 by which vector 908 must be rotated to coincide with projection 910, where anti-clockwise is positive as shown and clockwise is negative. The result of this analysis is the new force vector 912 and offset value of nagnitude 914 and sign 918.

A similar example but for a diagonal neighbor 932 of element 930 is shown in FIG. 9b. The projection 940 of vector 938 onto force vector 934 is constructed. A new force vector 942 is constructed from the center 946 of field element 930 to the boundary 936 by adding the neighbor's force vector 934 to the projection 940. An offset value is computed whose magnitude is equal to the length 944 of the difference between vector 938 and projection 940, and whose sign is negative since vector 938 must be rotated clockwise 948 to coincide with projection 940.

Another example is shown in FIG. 9c, where in this case the boundarv 966 passes between field element 960 and its neighbor 962. The projection 970 of vector 968 onto force vector 964 is constructed. A new force vector 972 is constructed from the center 976 of field element 960 to the boundary 966 by adding the neighbor's force vector 964 to the projection 970. An offset value is computed whose magnitude is equal to the length 974 of the difference between vector 968 and projection 970, and whose sign is negative since vector 968 must be rotated clockwise 978 to coincide with projection 970.

Figure 10:
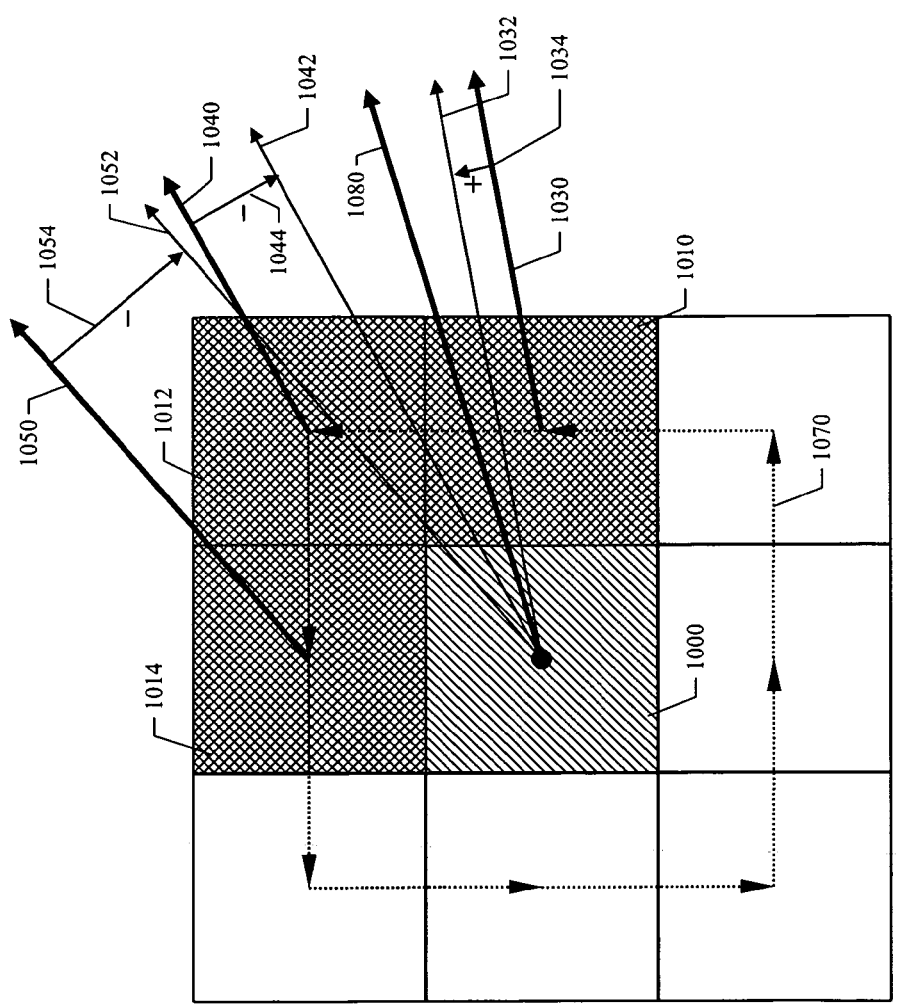
FIG. 10 shows further details of the propagate phase of the field generation module of FIG. 2.

Further details of propagate step 262 of the field generation step 210 are shown in FIG. 10. Each element of the field array is examined. Any element whose eval code 440 is "expect blank" is considered for possible propagation of the field to that element. All other field elements are already in a final state and are skipped. For each field element so considered, the eight neighbors are examined. If two or more adjacent neighbors have valid force vectors or have eval codes equal to "don't care", the field will be propagated to the said field element; otherwise, the field element will be skipped and possibly considered again on a subsequent propagate step.

The rule specifying two or more adjacent neighbors is used to insure that there is sufficient information to be able to interpolate the field between neighbors. "Adjacent" means either sharing an edge, such as elements 1010 and 1012 of FIG. 10, or sharing a corner, such as elements 1010 and 1014.

In FIG. 10 element 1000 shaded light gray has eval code "expect blank", and neighbors 1010, 1012, and 1014, shaded medium gray, have valid force vectors (the field has been seeded at or already propagated to the neighbors). Neighboring element 1010 has force vector 1030, and following the method of FIG. 9 new force vector 1032 and positive offset 1034 are computed. Neighboring element 1012 has force vector 1040, and following the method of FIG. 9 new force vector 1042 and negative offset 1044 are computed. Neighboring element 1014 has force vector 1050, and following the method of FIG. 9 new force vector 1052 and negative offset 1054 are computed.

The neighbors of field element 1000 are scanned anticlockwise in sequence 1070. The starting and ending points of sequence 1070 are arbitrary. If exactly one positive to negative offset transition between adjacent neighbors is found, the field is propagated to element 1000 by constructing a force vector 1080 by interpolating between new force vectors 1032 and 1042.

In a preferred embodiment, the interpolation is a weighted average of vectors 1032 and 1042. The vector 1032 is weighted by the magnitude of offset 1044, and the vector 1042 is weighted by the magnitude of offset 1034. The effect is that the weight of a vector is proportional to the other vector's offset and inversely proportional to its own offset, so that vectors are more heavily weighted if they pass closer to their corresponding neighbor's force vector. As shown in FIG. 10, the offset corresponding to vector 1032 has the smaller magnitude, so it is more heavily weighted and therefore force vector 1080 passes closer to vector 1032 than to vector 1042.

One method for constructing a weighted average of vectors is to scale each vector by its corresponding weight, add the results, and then scale by the inverse of the sum of the weights. This is equivalent to an independent weighted average of the x and y components. In a preferred embodiment, an independent weighted average of the magnitude and direction is used. If the vectors 1032 and 1042 participating in the interpolation are pointing to distant points along a pattern boundary, or to different boundaries, the field is considered indeterminate at element 1000 and the eval code is set to "don't care". In a preferred embodiment, the vectors are considered to be pointing to distant points or different boundaries if either their magnitudes differ by more than 3 grid units or their directions differ by more than 135°.

In a preferred embodiment, a special case rule is used to propagate the field at the ends of an open chain. If a neighboring element with a valid force produces a small positive offset, and no anti-clockwise adjacent neighbor has a valid force, the field will propagate without interpolation by using, the new force vector as constructed by the method of FIG. 9. Similarly, if a neighboring element with a valid force produces a small negative offset, and no clockwise adjacent neighbor has a valid force, the field will propagate without interpolation by, using the new force vector as constructed by the method of FIG. 9. In a preferred embodiment, a small offset is one whose magnitude is less than $\frac{1}{10}^{th}$ of a grid unit.

If more than one positive to negative offset transition between adjacent neighbors, or application of the special case rule, is found, or if none are found, the field is considered indeterminate at element 1000 and the eval code is set to "don't care". One reason that no such transitions might be found is that neighboring field elements are themselves set to "don't care", for example the border elements 540 set by the initialization step 250.

If a valid force is propagated to element 1000, then corner code 450, polarity code 460, and the index of the nearest field dipole are also propagated by copying from whichever of the neighboring elements participating in the interpolation has the smallest offset magnitude (greatest weight). In the example of FIG. 10, the values would be copied from element 1010. If the special case rule was applied, the values are copied from the neighbor with small offset used to construct the new force vector.

Many variations on the above rules can be used within the spirit of the invention to achieve similar results. Indeed any method that produces force vectors that point to the nearest point along a pattern boundary can be used to practice this invention.

Figure 11:
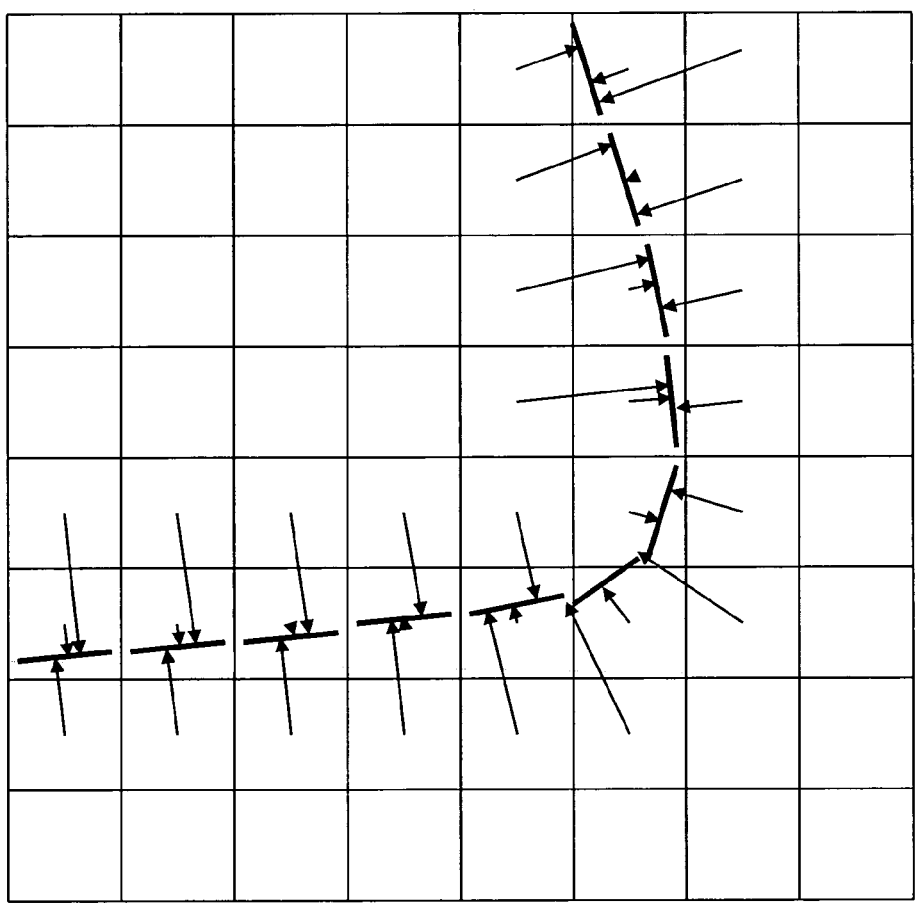
FIG. 11 shows the same portion of the field array that was shown after seeding in FIG. 6, but with new force vectors resulting from one propagation.
Figure 12:
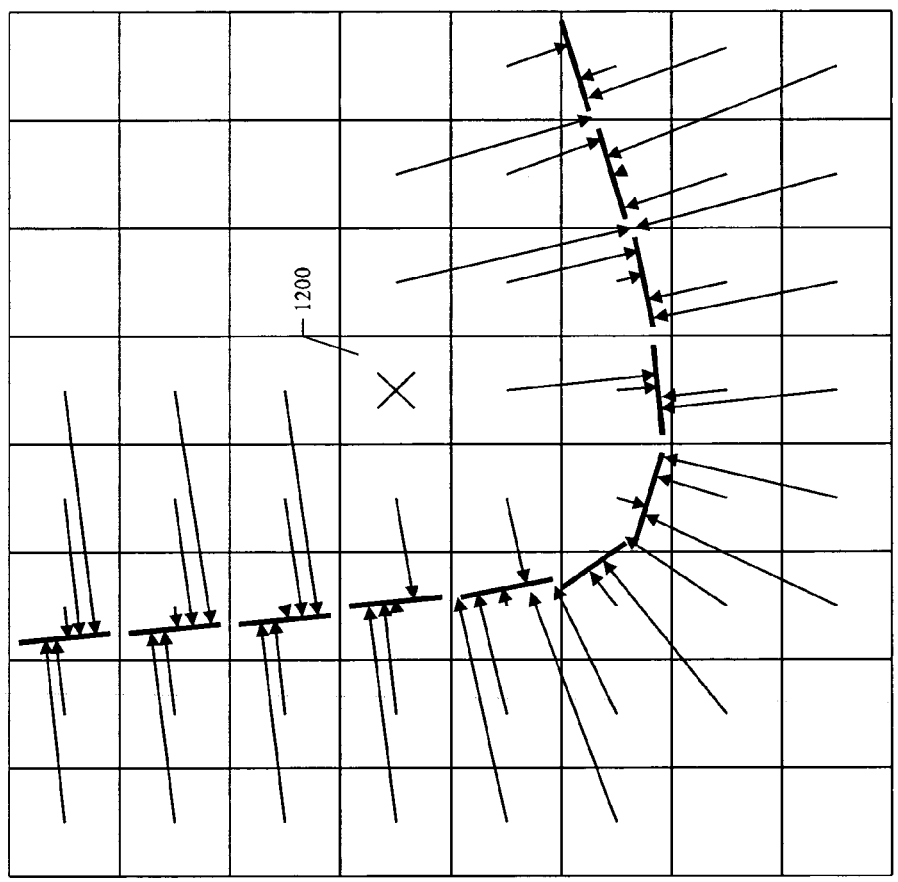
FIG. 12 shows the same portion of the field array as FIG. 11, after two propagations.

FIG. 11 shows the same portion of the field array that was shown after seeding in FIG. 6, but with new force vectors resulting from one propagation step. FIG. 12 shows the same portion after two propagation steps. Note in FIG. 12 field element 1200 whose eval code is set to "don't care" because more than one positive to negative offset transition between adjacent neighbors was found.

Figure 13:
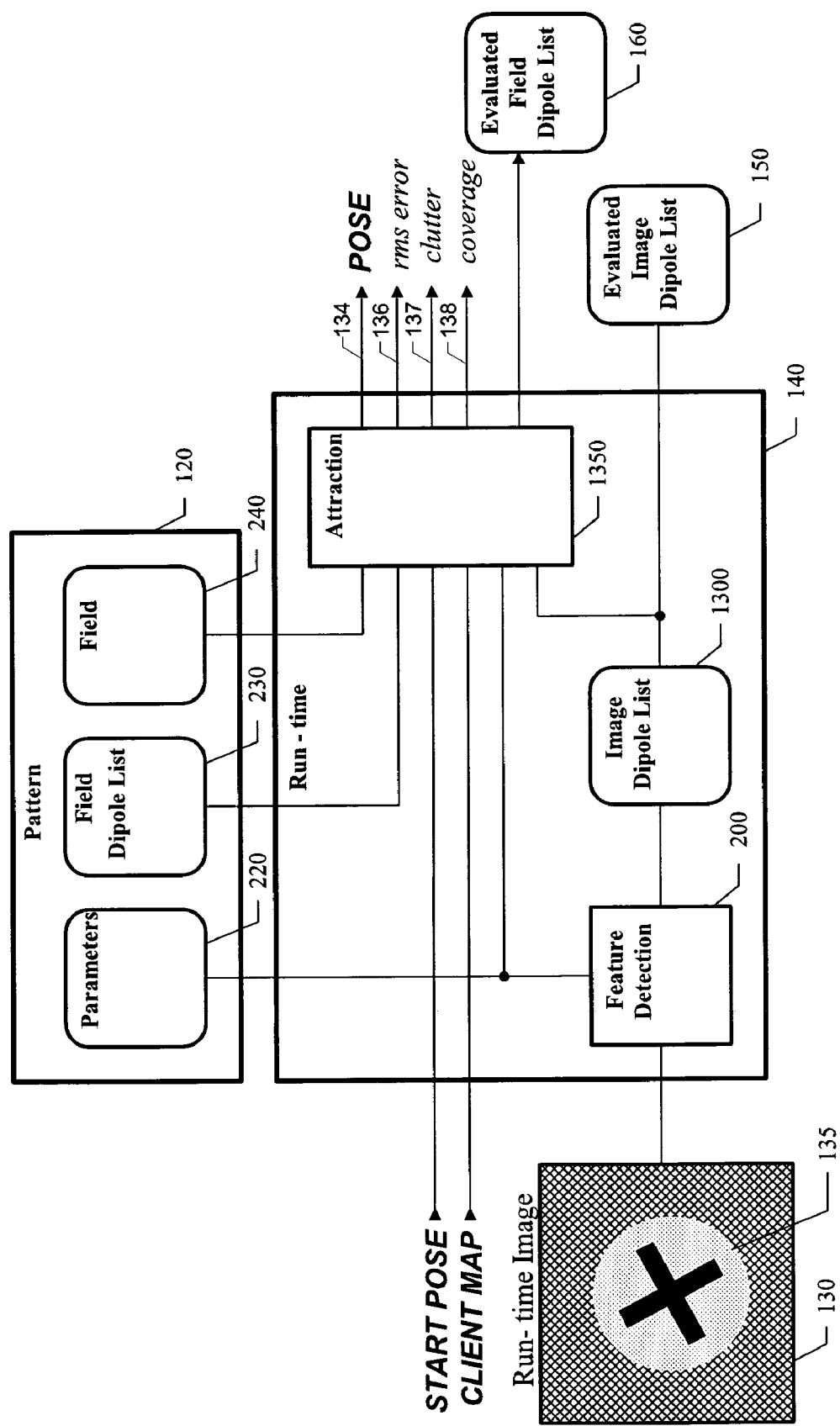
FIG. 13 is a block diagram of the run-time module of the preferred embodiment of FIG. 1.

FIG. 13 shows a block diagram of the run-time module 140 of a preferred embodiment. Run-time module 140 analyzes the image 130, using the stored pattern 120, the starting pose 132, and the client map 131. As a result of the analysis, the run-time module produces a pose 134 that maps pattern points to accurately corresponding image points.

The run-time module 140 produces an rms error value 136 that is a measure of the degree of match between the pattern and the image, a coverage value 138 that is a measure of the fraction of the pattern to which corresponding image features have been found, and a clutter value 137 that is a measure of extra features found in the image that do not correspond to pattern features.

Figure 25:
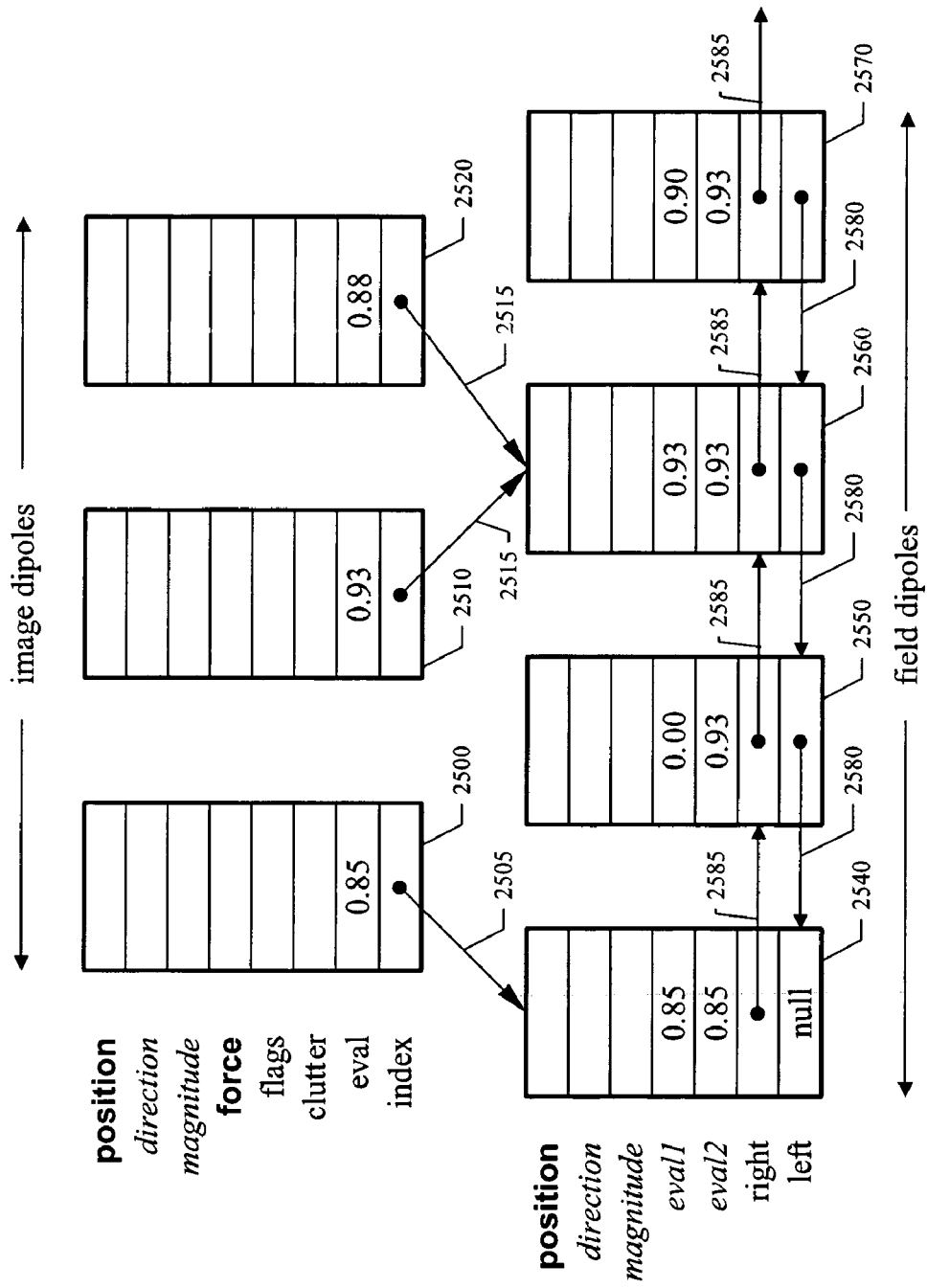
FIG. 25 is a graphical illustration of a plurality of image dipoles and a plurality of connected field dipoles, showing field dipole evaluation.

The run-time module 140 produces an evaluated image dipole list 150 and an evaluated field dipole list 160, e.g. as shown in FIG. 25. The clutter values of the evaluated image dipole list 150 can be used to identify features in the image 130 not present in the pattern 105 (shown in FIG. 1). These probability values range from 0 to 1 and indicate the likelihood that the image feature is not present in the pattern. The "eval2" values (FIG. 25) of the evaluated field dipole list 160 can be used to identify features in the pattern 105 not present in the image 130. These probability values range from 0 to 1, and indicate the likelihood that the pattern feature was found in the image.

The run-time module 140 uses a feature detection module 200 to process the image 130 to produce an image dipole list 1300. In a preferred embodiment, the feature detection module 200 is identical to that used by training module 110, and is controlled by the same parameter settings stored in pattern parameters 220, and is further described in conjunction with FIG. 26. In other embodiments, different methods or different parameters setting are used as appropriate for a specific application.

At least one attraction module 1350 uses pattern parameters 220, field dipole set 230, field 240, image dipole list 1300, and the starting pose 132 and client map 131, to refine the starting pose 132 and produce the other outputs 136, 138, 160, and 150.

Figure 14:
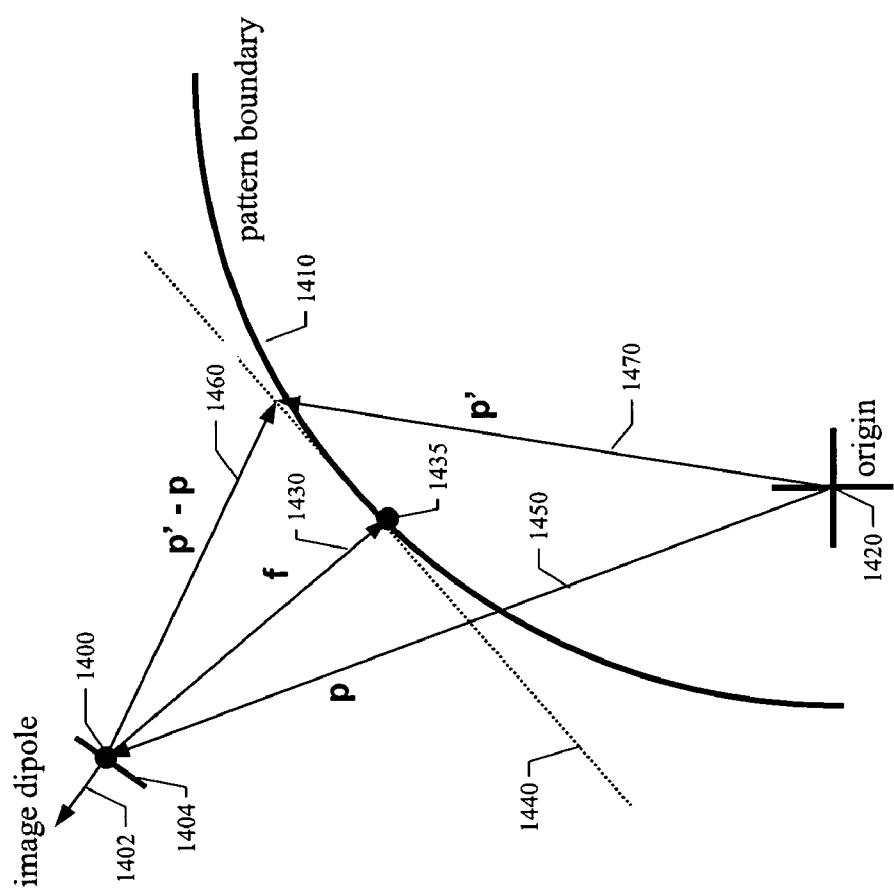
FIG. 14 is a diagram illustrating a least squares method for determining a pose that best accounts for the evidence of the image dipoles at each attraction step.

FIG. 14 is a diagram that is used to derive the mathematical basis for a preferred embodiment that uses a least-squares method to determine a pose that best accounts for the evidence of the image dipoles at each attraction step. An image dipole, mapped by the current pose to field point 1400 and with direction 1402, is considered. A small section of image boundary 1404 is also shown as an aid in understanding the diagram.

The field has force f 1430 at mapped image dipole point 1400, pointing to the nearest point 1435 along pattern boundary 1410. Note that the force 1430 is normal to the pattern boundary 1410 at point 1435, and the mapped image dipole direction 1402 is similar but not equal, modulo 180°, to that of the force.

The mapped image dipole point 1400 has position vector p 1450 relative to the field origin 1420. The existence of an image dipole at field point 1400, with force 1430 and mapped dipole direction similar to the force direction (in a preferred embodiment, similar modulo 180°), is taken as evidence that the current pose should be modified so that the image dipole is mapped so as to lie somewhere along line 1440 tangent to pattern boundary 1410 at point 1435. The dipole provides no evidence as to position normal to the force, that is along tangent 1440. The position vector p'1470 defines a point on tangent 1440, and the difference vector p-p'1460 indicates how the mapped dipole position might move as a result of the force.

Suppose that [C, t] is a six-degree-of-freedom coordinate transform that maps the current pose into a new, hopefully more accurate, pose. This transform is called the motion transform, because it tells how the image dipoles will move with respect to the field under the influence of the forces of the field. Here C is a 2×2 matrix and t is a translation vector. The evidence under consideration suggests that this transform should map p to p':

$$p' = Cp + t. \tag{1}$$

Let I be the identity matrix and define $$f = |f| \quad (2)$$

$$\hat{f} = \frac{f}{|f|} \quad (3)$$

$$\dot{C} = C - I \quad (4)$$

From the diagram of FIG. 14 it can be seen that $$f = (p' - p) \cdot \hat{f} \quad (5a)$$
$$= (Cp + t - p) \cdot \hat{f} \quad (5b)$$
$$= [(C - I)p + t] \cdot \hat{f} \quad (5c)$$
$$= (\dot{C}p + t) \cdot \hat{f} \quad (5d)$$

Thus, given an image dipole that maps to field point p with force $f = f\hat{f}$ we have one equation in the six unknowns [C, t] that tells us how to map the current pose to get a new pose. With six dipoles we can solve for the six-degrees-of-freedom, but in practice the evidence obtained from only six dipoles is generally not sufficient to get an accurate or even meaningful solution. In practice we use many dipoles, typically anywhere from a few dozen to a few thousand, and some method for solving an over-determined set of equations.

In a preferred embodiment, a least-squares method is used. An error term for the $i^{th}$ dipole can be defined as $$e_i = (\dot{C}p_i + t) \cdot \hat{f}_i - f_i \quad (6)$$

With this definition a least-squares problem can be set up and solved by methods well-known in the art. If weights $w_i$ are determined for each dipole, we can write the sum squared error as $$E = \sum_i w_i \left[ (\dot{C}p_i + t) \cdot \hat{f}_i - f_i \right]^2 \quad (7)$$

In practice it is usually desirable to solve for fewer than six-degrees-of-freedom. Some patterns would result in a singular or unstable solutions if certain degrees of freedom are included. For example, circles cannot be solved for orientation and corners cannot be solved for size. In other cases, a solution would be possible, but some degrees of freedom, particularly aspect ratio and skew, are known not to vary and might cause problems if included. Perhaps the most serious such problem is that unreliable evidence, present to some degree in all images, will have a more serious effect when more degrees of freedom are allowed to vary. Another problem is that somewhat more computation is needed to solve for the additional degrees of freedom.

In a preferred embodiment the least-squares problem is set up in 4 degrees of freedom corresponding to x translation, y translation, orientation, and size. Sums needed for a least-squares solution in the 4 degrees of freedom are computed, and pattern parameters 220 specify which of the degrees of freedom will be solved for.

In an orthonormal coordinate system we can constrain the matrix $\dot{C}$ to orientation and size variation by writing it as $$\dot{C} = \begin{pmatrix} p & q \\ -q & p \end{pmatrix} \quad (8a)$$

$$= pI + q \begin{pmatrix} 0 & 1 \\ -1 & 0 \end{pmatrix} \quad (8b)$$

In practical applications, however, the images themselves are almost never orthonormal. CCD cameras, for example, typically have pixels that are non-square by a percent or so. For line scan cameras, the angle between the coordinate axes depends on mechanical alignment and so the coordinate axes may not be perfectly orthogonal. The variations from square are small, but easily detectable given the accuracy that can be achieved with the invention. Furthermore, it is sometimes useful to have a significantly non-orthonormal field. For example, a field generated from a square pattern can be used to localize and inspect a rectangular or even parallelogram-shaped instance of the pattern by using an appropriate starting pose.

In these cases we generally want the orientation degree of freedom defined by an orthonormal, real-world coordinate system rather than image or field coordinates. We re-write $\dot{C}$ as $$\dot{C} = pI - qN \quad (9)$$

where the elements of matrix N are the components of the normal tensor in the field coordinate system. The normal tensor is a mixed $2^{nd}$-rank tensor, a vector-valued function of vectors that, informally, tells how to rotate a vector 90°. In an orthonormal coordinate system, of course, the components of the normal tensor are $$\begin{pmatrix} 0 & 1 \\ -1 & 0 \end{pmatrix}.$$

The components of the normal tensor are computed from the current pose and from a coordinate transform called the client map that transforms points in an orthonormal but otherwise arbitrary reference coordinate system to points in the run-time image.

We can now re-write equation 7, the sum squared error, as $$E = \sum_i w_i \left[ \left[ (pI + qN)p_i + t \right] \cdot \hat{f}_i - f_i \right]^2 \quad (10a)$$

$$= \sum_i w_i \left[ pp_i \cdot \hat{f}_i + qNp_i \cdot \hat{f}_i + t \cdot \hat{f}_i - f_i \right]^2 \quad (10b)$$

Now we can substitute $$r_i = p_i \hat{f}_i \quad (11)$$

$$s_i = Np_i \hat{f}_i \quad (12)$$

$$t = \begin{pmatrix} x \\ y \end{pmatrix} \quad (13)$$

$$\hat{f}_i = \begin{pmatrix} u_i \\ v_i \end{pmatrix} \quad (14)$$

into equation 10b and finally we have $$E = \sum_i w_i[(xu_i + yv_i + pr_i + qs_i - f_i)]^2 \quad (15)$$

A least-squares problem based on equation 15 is easy to set up and solve for x, y, p, and q by well-known methods. The desired motion transform [C, t] is obtained from said solution using equations 4, 9, and 13. The current pose is composed with the motion transform to obtain the new pose.

Figure 15:
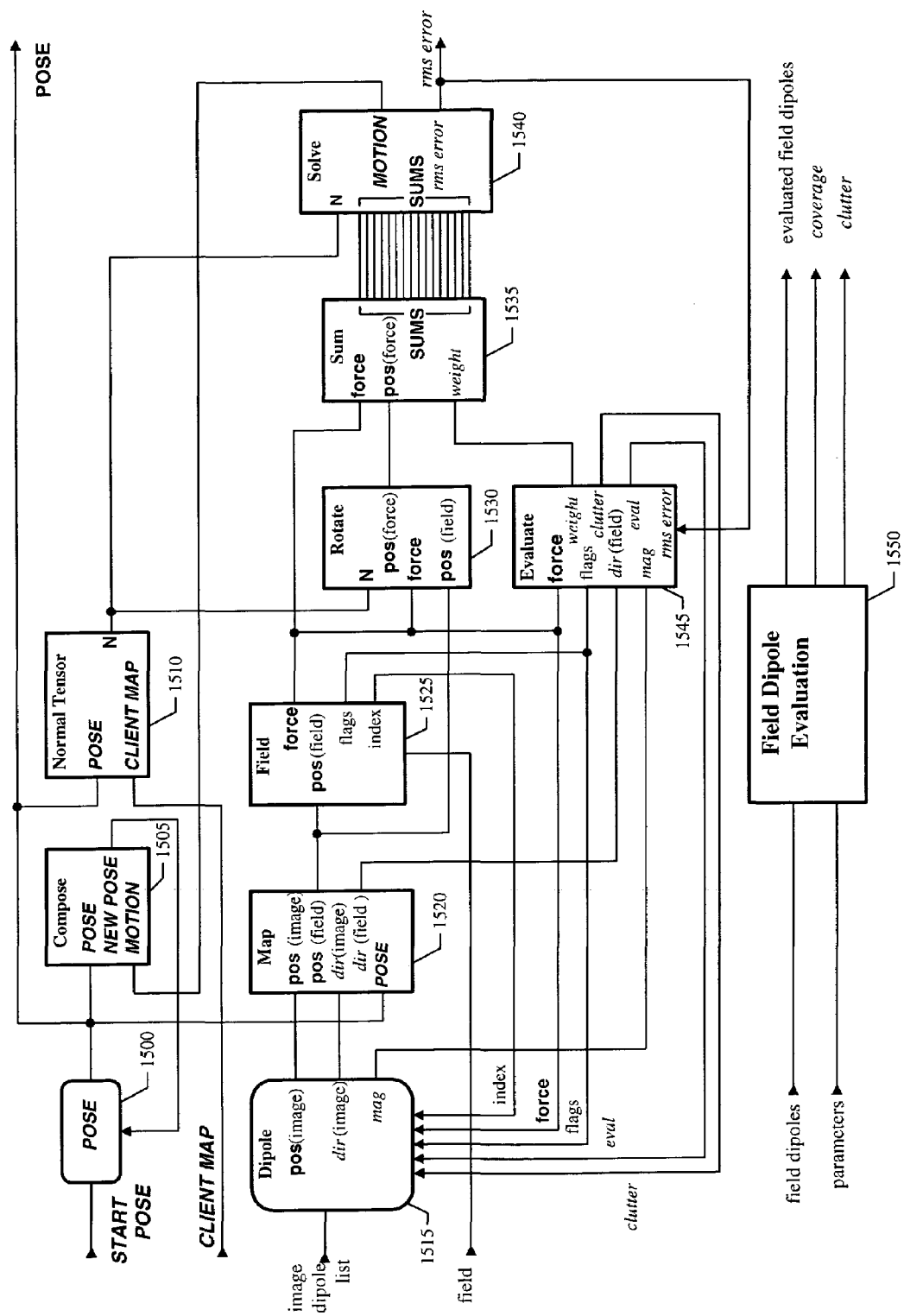
FIG. 15 is a block diagram of the attraction module of FIG. 13.
Figure 27A:
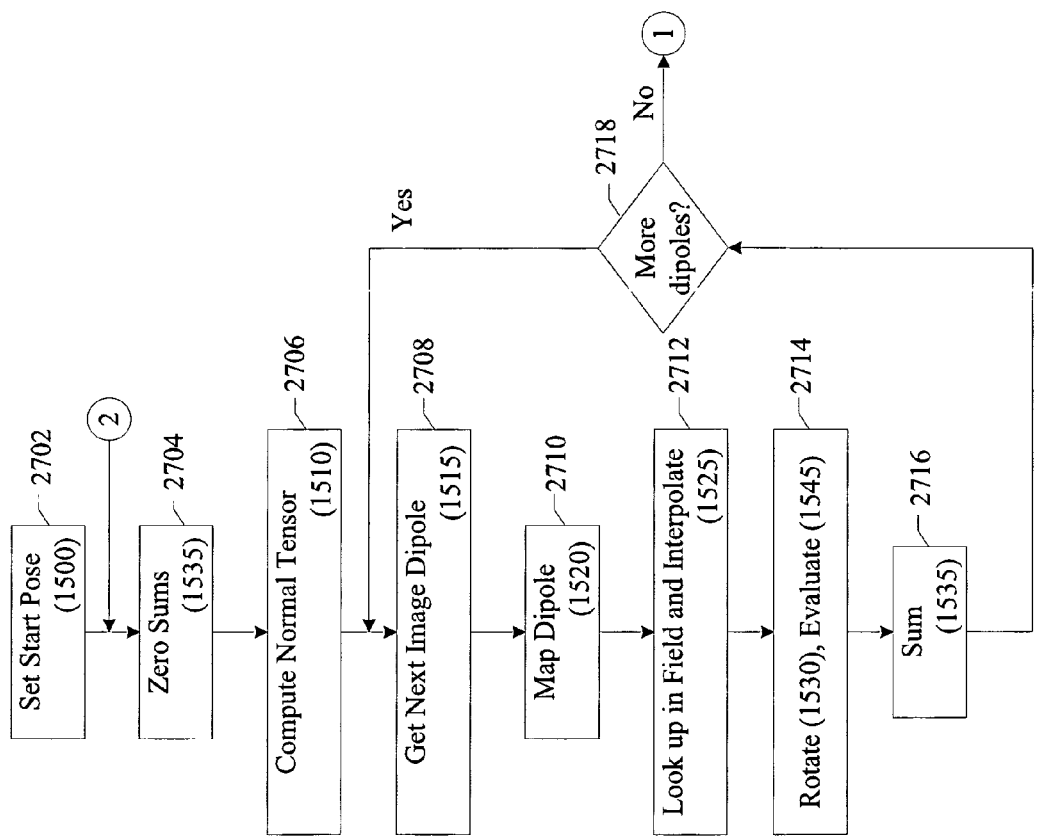
FIGS. 27A and 27B are flow diagrams illustrating the sequence of operations performed by the modules of FIG. 15.
Figure 27B:
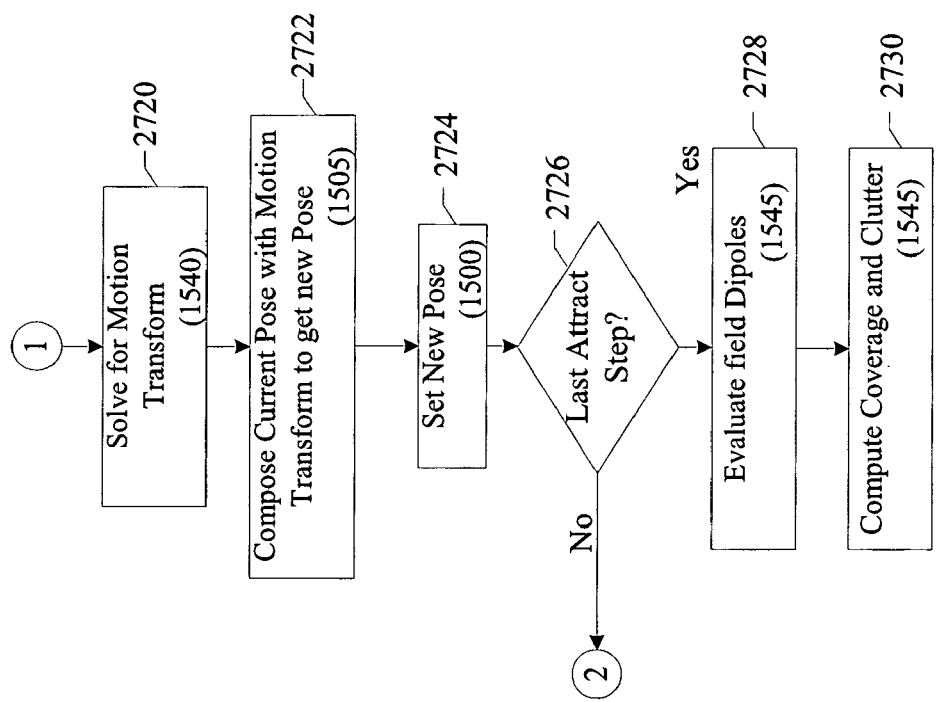

FIG. 15 is a block diagram of the attraction module 1350 for a preferred embodiment based on a least-squares method of best accounting for the evidence of the image dipoles. In addition, to further clarify a preferred sequence of operation of the modules of FIG. 15, a flow chart is provided in FIGS. 27A and 27B. Steps of the flow chart include reference numbers from FIG. 15 in parentheses to help cross-correlate the figures. A current pose 1500 is initially set to the start pose 2702 and updated at the end of each attraction step 2724. After the sum module 1535 is initialized to zero 2704, the normal tensor computation module 1510 uses the current pose and client map to compute the normal tensor N 2706 for the current attraction step.

Each image dipole 1515 of the image dipole list 1300 (FIG. 13) is processed 2708. The position and direction of dipole 1515 are mapped 2710 from image coordinates to field coordinates by map module 1520, using the current pose 1500. The mapped position is used by field module 1525 to determine the force, flags 430, and index of nearest field dipole 2712. The force, flags, and index are stored in the image dipole 1515 for later use. The normal tensor, force, and image dipole position in field coordinates are used by a rotate module 1530 to obtain the dipole's position in force coordinates (r, s) 2714 as specified by equations 11 and 12.

An evaluate module 1545 examines the force, flags, image dipole direction in field coordinates, and dipole gradient magnitude and computes a weight for attraction (localization) purposes and evaluation and clutter values for inspection purposes 2714. In some embodiments, the evaluate module 1545 also considers the rms error from the previous attraction step in determining the weight and evaluation. The evaluation and clutter values are stored in the image dipole 1515 for later use.

A sum module 1535 uses the force, dipole position in force coordinates, and weight to compute sums needed for the least-squares solution 2716. If there are no more dipoles 2718, a solve module 1540 uses the sums and the normal tensor to solve for the motion transform and compute the rms error 2720. A compose module 1505 composes the current pose with the motion transform to produce a new pose 2722, which will be the current pose for the next attraction step, or the final pose if this is the last attraction step 2726.

In a preferred embodiment where inspection is being performed, at the end of the last attraction step, the field dipole evaluation module 1550 evaluates the image dipole list 2728, which has now been evaluated by evaluate module 1545, and the field dipole set 230 stored in the pattern 120, and produces an evaluated field dipole list, coverage rating, and clutter rating 2730.

Figure 16:
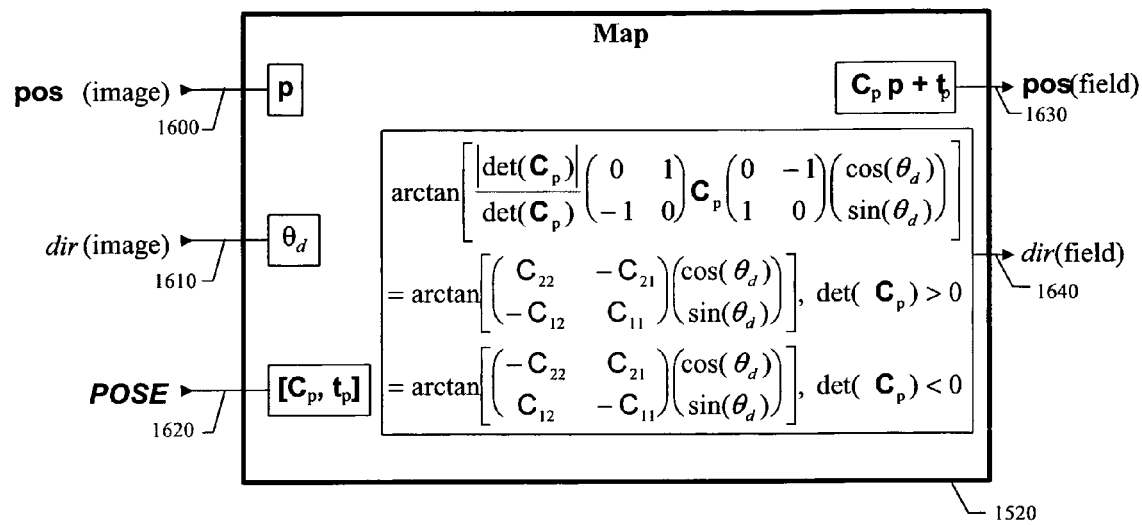
FIG. 16 is a block diagram of the map module of FIG. 15.
Figure 17:
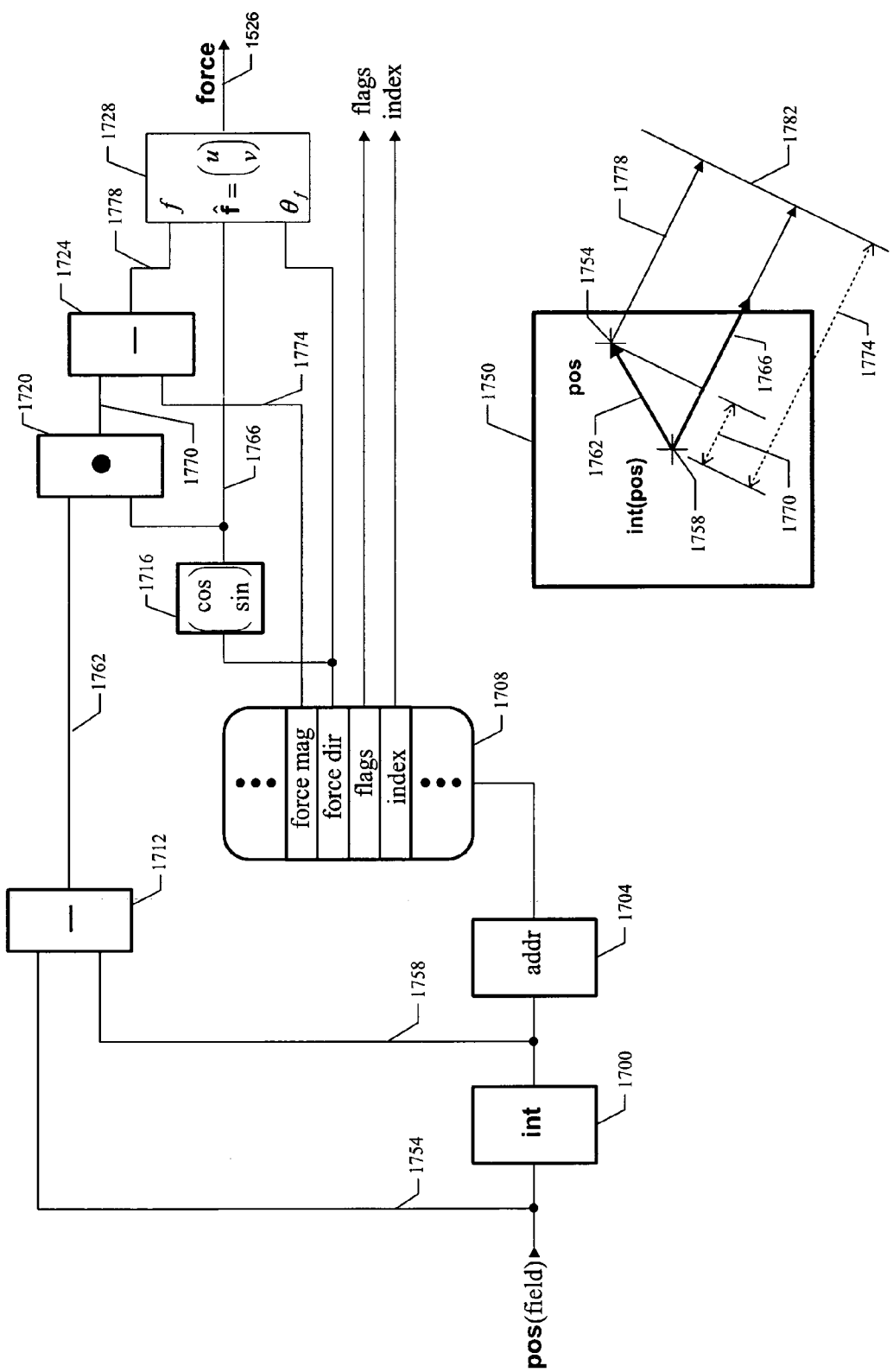
FIG. 17 is a block diagram of the field module of FIG. 15.

FIG. 16 gives details for the map module 1520 of FIG. 15. Inputs are image dipole position in image coordinates 1600, image dipole direction with respect to image coordinates 1610, and the current pose 1620. One output is the dipole position in field coordinates 1630, computed as shown.

The other output is the dipole direction with respect to field coordinates 1640, computed as shown. The formula for output dir(field) 1640 effectively does the following, reading the vector and matrix operations right to left:

Construct a unit vector in the dipole direction, with respect to image coordinates, by computing the cosine and sine of the angle $\theta_d$.

Rotate the unit vector 90° to get a direction along the boundary that contains the dipole.

Map the rotated unit vector to field coordinates using $C_p$ to get a boundary direction in field coordinates.

Rotate the mapped rotated unit vector −90° to get a direction normal to the boundary in field coordinates.

If the determinant of the pose matrix is negative, the transform changes the left- or right-handedness of the coordinate system, so rotate the vector 180° because the −90° of the previous step should have been +90°.

Compute the angle of the resulting vector using the well-known version of the arctangent function of two arguments whose result is in the range 0° to 360°.

Note as shown in output dir(field) 1640 that these calculations can be simplified considerably. In a preferred embodiment, the simplified formula is used at the beginning of each attraction step to compute a 256-element lookup table, indexed by an 8-bit binary angle, for use by the map block 1520. This allows the direction mapping operation to be executed at high speed for each dipole.

When computing the lookup table, the symmetry of the formula requires us to compute only 128 elements of the table; the other elements are the negative of the computed ones. As a further improvement in computation time, 64 even-indexed elements are computed, and the odd-indexed elements are determined by interpolation from the even-indexed elements. Thus the formula need only be applied 64 times. The arctangent function is computed using the well-known CORDIC method.

Note that in computing output dir(field) 1640 we map the boundary direction instead of the dipole direction. This is because, in the embodiment described herein, directions are determined by a gradient estimation method 330 and Cartesian to polar conversion method 340 that assumes square pixels. This is not a problem except when mapping directions between non-orthonormal coordinate systems. In that case, the boundary direction must be used.

FIG. 17 shows a block diagram of the field module 1525 of FIG. 15, and a corresponding geometric diagram that illustrates the computation being performed. Image dipole position in field coordinates 1754 is input to the field block 1525. The coordinates 1754 fall within field grid cell 1750.

The coordinates are rounded to integer field grid position 1758 by integer rounding module 1700. The integer field grid coordinates 1758 are used by address generation module 1704 to produce a memory address used to look up field element 1708, corresponding to grid cell 1750. In the embodiment shown, the index of the nearest field dipole is stored with the other field information, but in some embodiments, as described herein, the index is kept in a separate array.

The force direction $\theta_f$, flags, and index obtained from field element 1708 are direct outputs of field module 1525, but the force magnitude 1774 is interpolated so that the force vector is a reasonably smooth function of real-valued position within the field.

Force interpolation is based on the assumption that the force stored in field element 1708, corresponding to integer grid position 1758, points to an approximately straight-line section of pattern boundary 1782. This is a fast and accurate interpolation we can use with the information available. A more compute intensive interpolation could use neighboring field elements as well.

To interpolate force magnitude, the integer position 1758 is subtracted by module 1712 from the real-valued position 1754 to produce sub-grid position vector 1762. A unit vector 1766 in the force direction is constructed by cosine/sine module 1716, implemented as a lookup table in a preferred embodiment. The dot product 1770 of sub-grid position vector 1762 and unit vector 1766 is computed by dot product module 1720. The dot product 1770 is subtracted from force magnitude 1774 by the subtraction module 1724 to produce interpolated force magnitude 1778.

The interpolated force magnitude 1778, unit vector in the force direction 1766, and force direction angle stored in field element 1708, are collected in output module 1728 and become part of the force vector 1526 produced by field module 1525.

In another embodiment, not shown, at least one force vector is stored in each field element, pointing to the nearest points along at least one pattern boundary. The field module 1525 examines image dipole direction in addition to position, and uses the stored force vector that is closest to the dipole direction for interpolation and output to subsequent steps.

Figure 18:
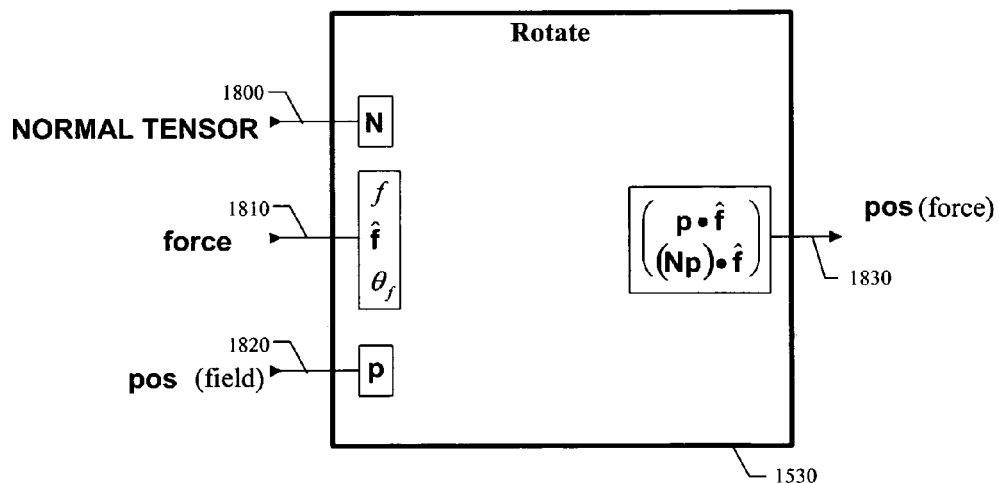
FIG. 18 is a block diagram of the rotate module of FIG. 15.

FIG. 18 gives details for the rotate module 1530 of FIG. 15. Inputs are the normal tensor 1800, force 1810, and image dipole position in field coordinates 1820. Output is image dipole position in force coordinates pos(force) 1830, computed as shown, and as described above by equations 11 and 12.

FIG. 19 shows various preferred fuzzy logic processing modules that are used in evaluate module 1545 of a preferred embodiment illustrated in FIG. 20.

Figure 19A:
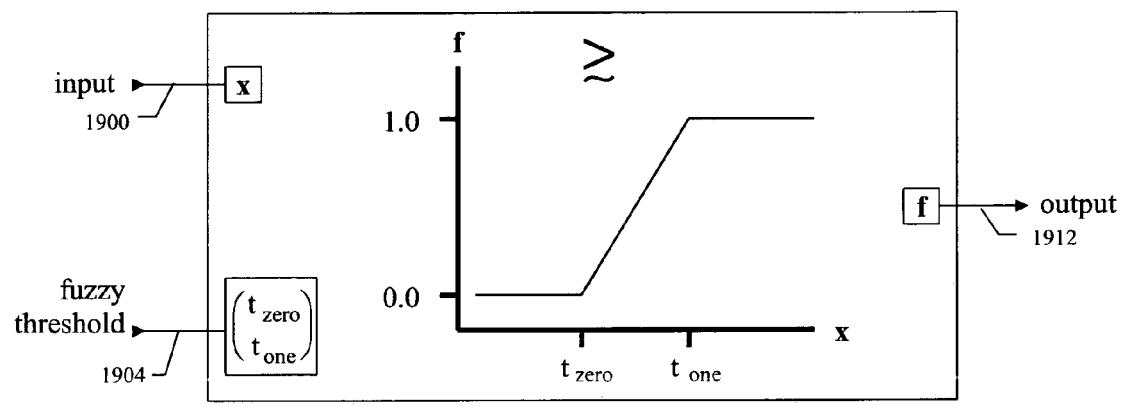
FIGS. 19A, 19B, and 19C show output as a function of input for three fuzzy logic processing elements.

FIG. 19a shows a fuzzy greater than module, which takes a real-valued input 1900 and a fuzzy threshold 1904, and produces a fuzzy logic value 1912. The fuzzy threshold 1904 is an ordered pair that specifies points along the x axis of graph 1908. The graph 1908 shows the fuzzy logic output 1912 as a function of input 1900. As can be seen, the fuzzy logic value falls within the range 0.0 to 1.0, inclusive.

Figure 19B:
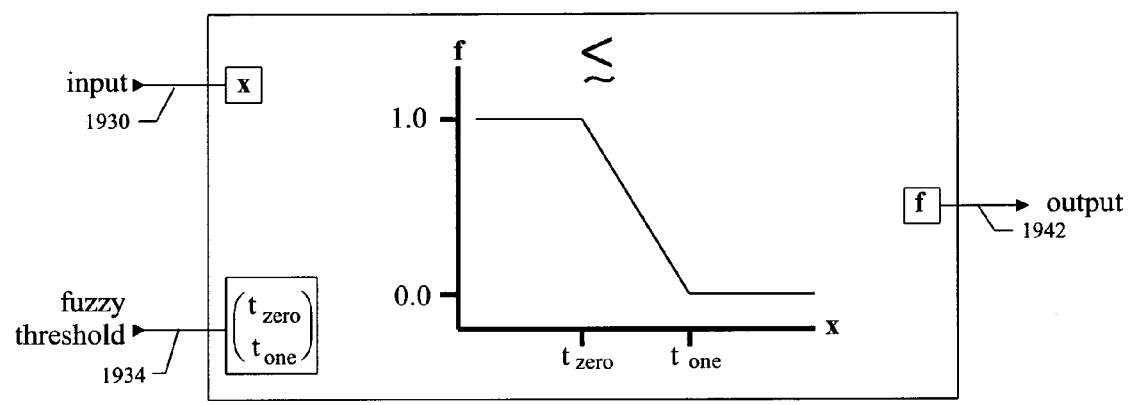

FIG. 19b shows a fuzzy less than module, which takes a real-valued input 1930 and a fuzzy threshold 1934, and produces a fuzzy logic value 1942. The fuzzy threshold 1934 is an ordered pair that specifies points along the x axis of graph 1938. The graph 1938 shows the fuzzy logic output 1942 as a function of input 1930. As can be seen, the fuzzy logic value falls within the range 0.0 to 1.0, inclusive.

Figure 19C:
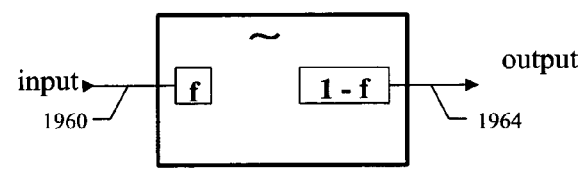

FIG. 19c shows a fuzzy not module. Fuzzy logic value input 1960 is inverted by subtracting it from 1 to produce fuzzy logic value output 1964.

Figure 20A:
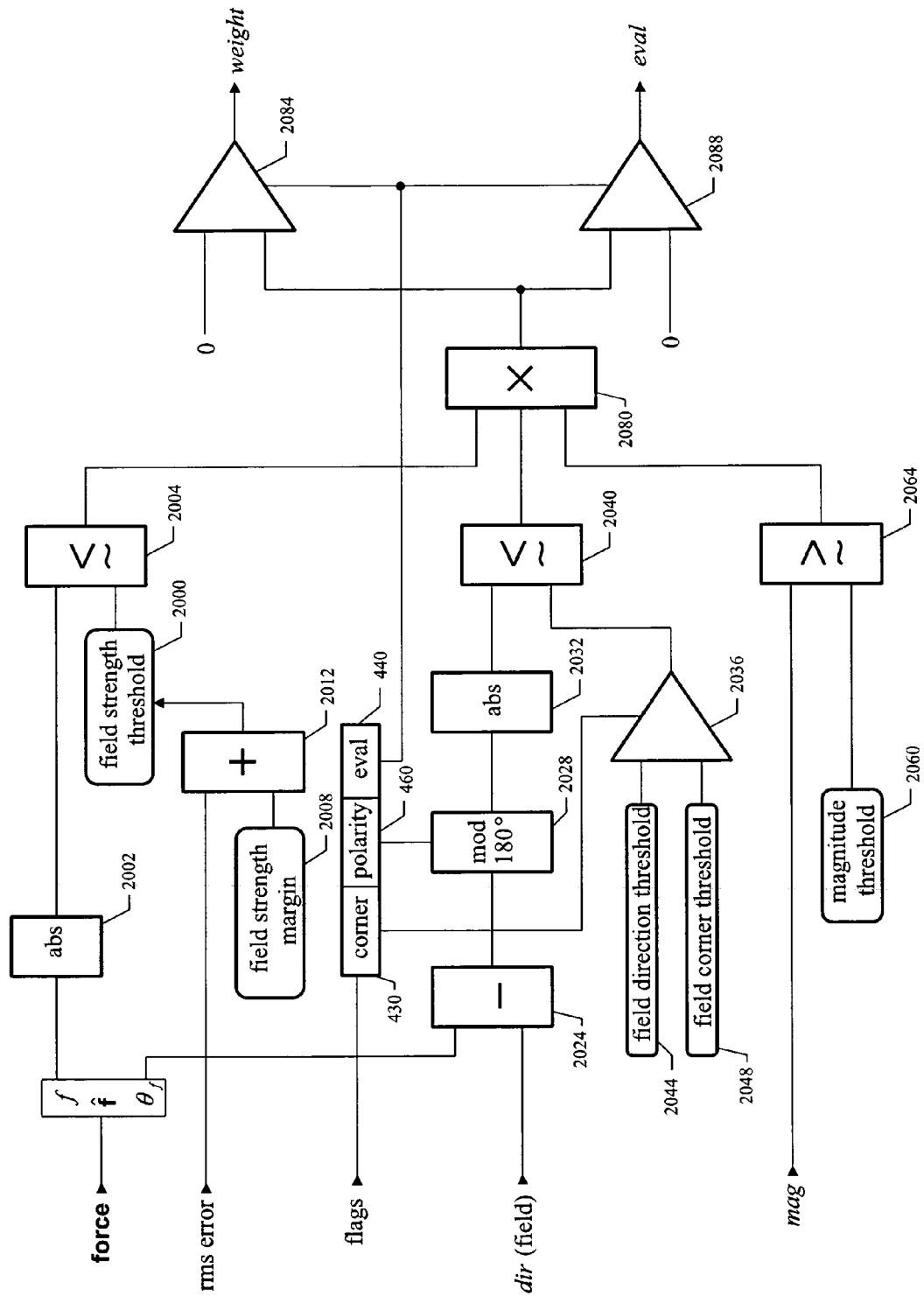
FIG. 20A is a schematic diagram of the portion of the evaluate module of FIG. 15, showing a preferred system for calculating 'weight' and 'eval'.
Figure 20B:
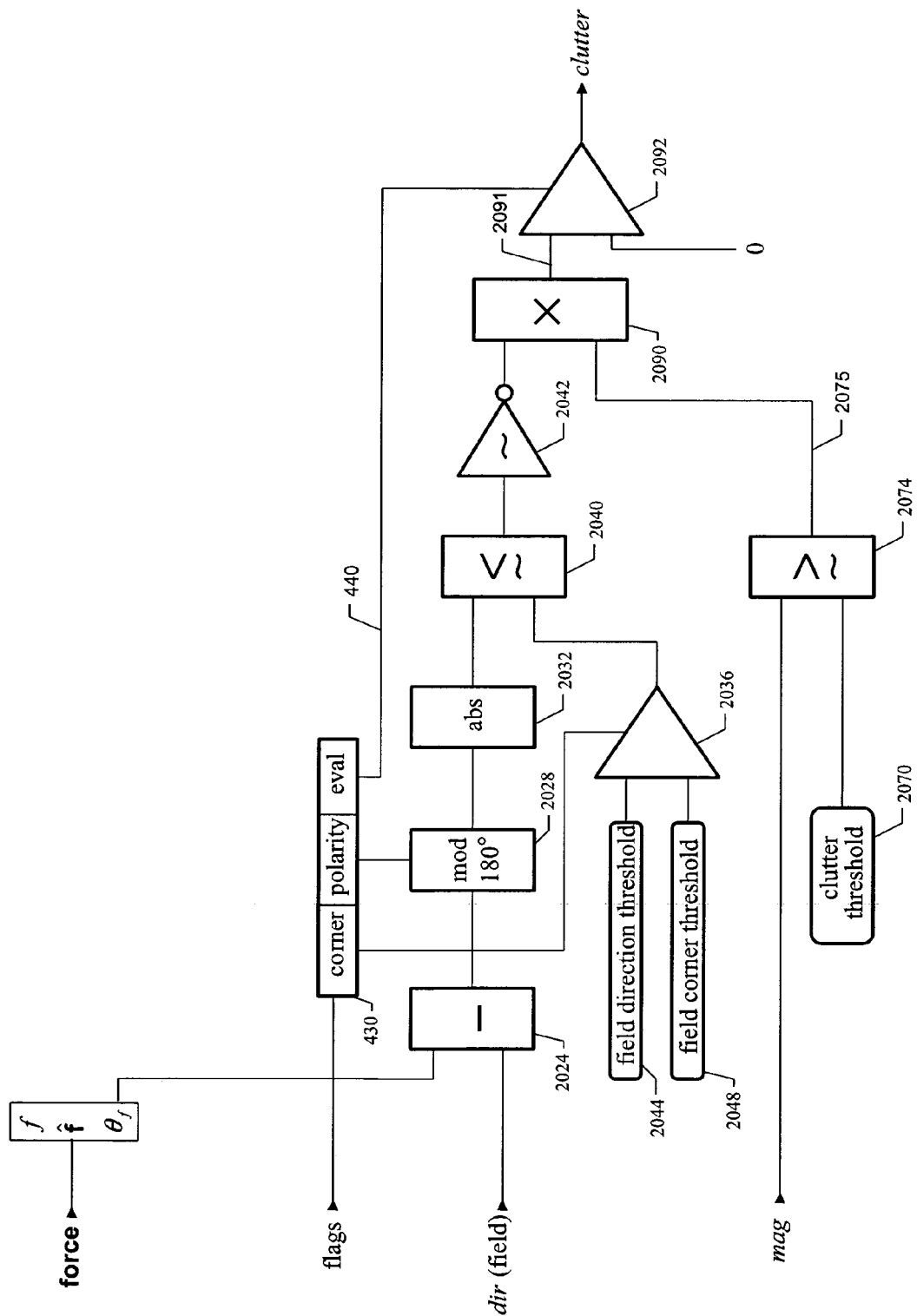
FIG. 20B is a schematic diagram of the portion of the evaluate module of FIG. 15, showing a preferred system for calculating 'clutter'.

FIG. 20 is a block diagram of a preferred embodiment of the evaluate module 1545 of FIG. 15. FIG. 20a shows the portion responsible for computing the weight and eval values, and FIG. 20b shows the portion responsible for computing the clutter value.

Referring to FIG. 20a, the computation of weight and eval is based on the force magnitude 'f', a comparison of the force direction $\theta_f$, and image dipole direction dir(field), and the image dipole's gradient magnitude 'mag'. For each of these three factors in the evaluation, a fuzzy logic value is produced by fuzzy logic modules 2004, 2040, 2064, respectively, that indicates confidence in the reliability of the evidence provided by the image dipole being evaluated. The three fuzzy confidence factors so-produced are combined into a single confidence score by a combination module 2080 in the range 0.0 to 1.0. The weight and eval outputs are obtained by using the eval code 440 (FIG. 4) to select either the confidence score or the value 0.0.

Absolute value module 2002 computes the length of the force vector from force magnitude f, which in the preferred embodiment being described may be negative if the force and gradient directions differ. Fuzzy less than module 2004 compares the force length to a field strength threshold 2000, to produce a strength confidence factor that indicates high confidence for force lengths "below" the field strength threshold.

The field strength threshold 2000 is set based on pattern parameters 220 for the first attraction step. In a preferred embodiment, the first attraction step uses field strength threshold values $t_{zero}=2.0$ field grid units, and $t_{one}=3.0$ field grid units.

In the embodiment shown in FIG. 20, the field strength threshold 2000 is modified after each attraction step based on the rms error from the previous step. The modification is accomplished by addition module 2012, which adds the rms error to both the $t_{zero}$ and $t_{one}$ components of a field strength margin parameter 2008 to produce the new field strength threshold 2000. As a result, the field strength threshold 2000 is matched to how well the particular run-time image being analyzed fits the stored pattern at each attraction step.

The method of adjusting the field strength threshold based on the rms error of the previous step is effective in some applications, but in other cases it has been observed to result in some oscillation of the attraction rather than convergence on one solution. In a preferred embodiment, not shown, the field strength threshold is reduced in equal steps after each attraction step. Thus, as the attraction converges to a solution, image dipoles must be closer to pattern boundaries to be given high confidence.

The image dipole direction dir(field) is compared with the pattern boundary gradient direction by subtract module 2024. Recall that in the embodiment being described, the "force" direction $\theta_f$ reported by the field is actually boundary gradient direction, which is the same as or opposite of the true force direction. If pattern parameters 220 and polarity code 460 of flags 430 specify that gradient polarity is to be ignored, the angle difference from subtract module 2024 is constrained to the range $-90°$ to $+90°$ by mod $180°$ module 2028; otherwise, the angle $\theta_f$ is passed unmodified. The magnitude of the resulting angle difference is determined by absolute value module 2032.

The angle difference magnitude is compared to one of two fuzzy thresholds by fuzzy less than module 2040 to produce a direction confidence factor. If corner code 450 of flags 430 indicates "no corner", the field direction threshold 2044 is chosen by selection module 2036. If the corner code indicates "is corner", the field corner threshold 2048 is chosen. In a preferred embodiment, the field direction threshold 2044 has values $t_{zero}=11.25°$ and $t_{one}=22.5°$, and the field corner threshold 2048 has values $t_{zero}=39.375°$ and $t_{one}=50.625°$, reflecting the fact that a wider range of image dipole directions can reasonably correspond to a pattern boundary corner. In an alternate embodiment, a real-valued measure of curvature can be used instead of the binary "is corner" code, with multiple values of the field direction threshold possible.

The image dipole's gradient magnitude 'mag' is compared to a fuzzy magnitude threshold 2060 by fuzzy greater than module 2064 to produce a magnitude confidence factor. The magnitude threshold is intended to throw out very weak dipoles that are likely due to image noise or other artifacts, but the use of a fuzzy threshold gives more stable results than the more traditional hard threshold. In a preferred embodiment, the magnitude threshold 2060 uses the same value for $t_{zero}$ as the noise threshold chosen for the peak detector 350, and uses a value of $t_{one}$ equal to twice the value of $t_{zero}$.

The strength, direction, and magnitude confidence factors are combined by multiply module 2080 to produce an overall confidence score in the range 0 to 1. Based on eval code 440 of flags 430, the selection module 2084 chooses a value for weight and the selection module 2088 chooses a value for eval. If the eval code is "attract", the confidence score is chosen for the weight; otherwise the constant 0 is chosen so that the dipole is ignored for localization purposes. If the eval code is "attract" or "evaluate only", the confidence score is chosen for eval; otherwise the constant 0 is chosen to indicate that the dipole does not correspond to any portion of the pattern.

FIG. 20b shows a preferred embodiment for the calculation of the clutter value. The direction confidence factor produced by fuzzy less than module 2040 is inverted by fuzzy not element 2042. The image dipole's gradient magnitude is compared to a fuzzy clutter threshold 2070 by fuzzy greater than module 2074 to produce a clutter confidence factor 2075. The clutter confidence factor 2075 is multiplied by the inverted direction confidence factor by multiplier 2090 to produce a tentative clutter value 2091. If the eval code 440 is anything but "don't care", selection module 2092 chooses this tentative clutter value 209 as the dipole's clutter value; otherwise the constant 0 is chosen.

If the eval code 440 is "expect blank", the force magnitude 'mag' is meaningless, but in a preferred embodiment, the force direction $\theta_f$ encodes the gradient direction from the training image as described above in conjunction with FIG. 5. In this case, the computation of clutter uses this direction as it would the force direction $\theta_f$. This mode of operation is appropriate when it is desirable to minimize false alarms. Alternatively, if it is appropriate to minimize the chances of missing clutter, one can consider only the clutter confidence factor 275 when the eval code is "expect blank".

In a preferred embodiment, the clutter threshold 2070 has values of $t_{zero}$ and $t_{one}$, each value being equal to 1.5 times the $t_{zero}$ and $t_{one}$ values used for the magnitude threshold 2060.

In a preferred embodiment, the magnitude confidence factors and clutter confidence factors for all of the image dipoles are computed once and stored in the image dipole list 1300, rather than being recomputed for each attract step. This can be done because these confidence factors are independent of the current pose 1500.

Figure 21:
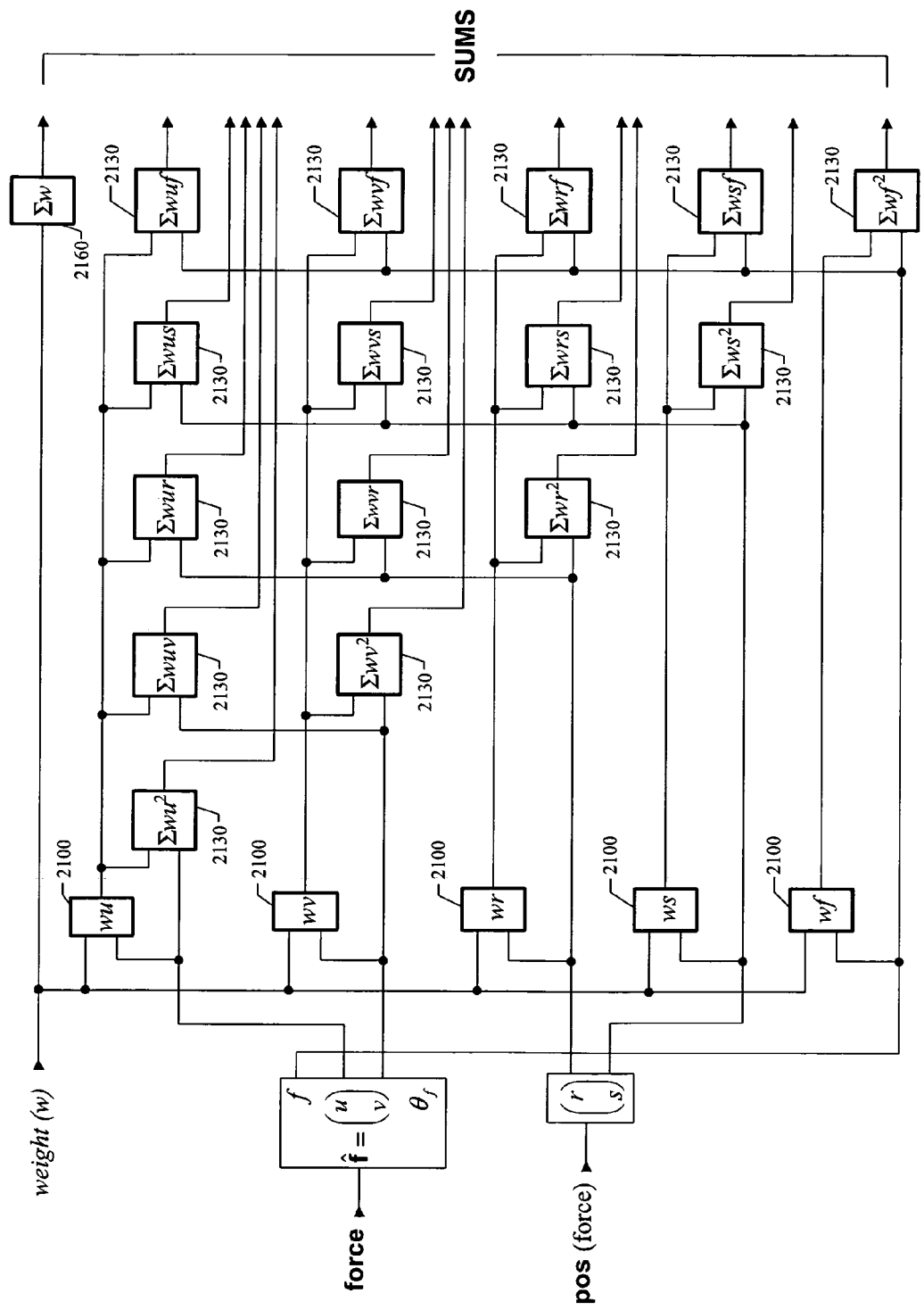
FIG. 21 is a schematic diagram of the sum module of FIG. 15.

FIG. 21 is a block diagram of sums module 1535 of FIG. 15. This module accumulates the weighted sums needed for the solution of the least-squares problem of equation 15. Five multiply modules 2100 perform the weighting. Fifteen multiply-accumulate modules 2130 and one accumulate module 2160 compute and store the sums needed. The sixteen accumulators are set to zero at the beginning of each attraction step. This four degree-of-freedom case is an exemplary embodiment, other numbers of degrees of freedom being possible.

FIG. 22 a–d give details of the solve module 1540 of FIG. 15, which produces the motion transform and the rms error value. The formulas shown are based on the solution of the least-squares problem of equation 15. Pattern parameters 220 specify which degrees of freedom are to be determined.

Figure 22A:
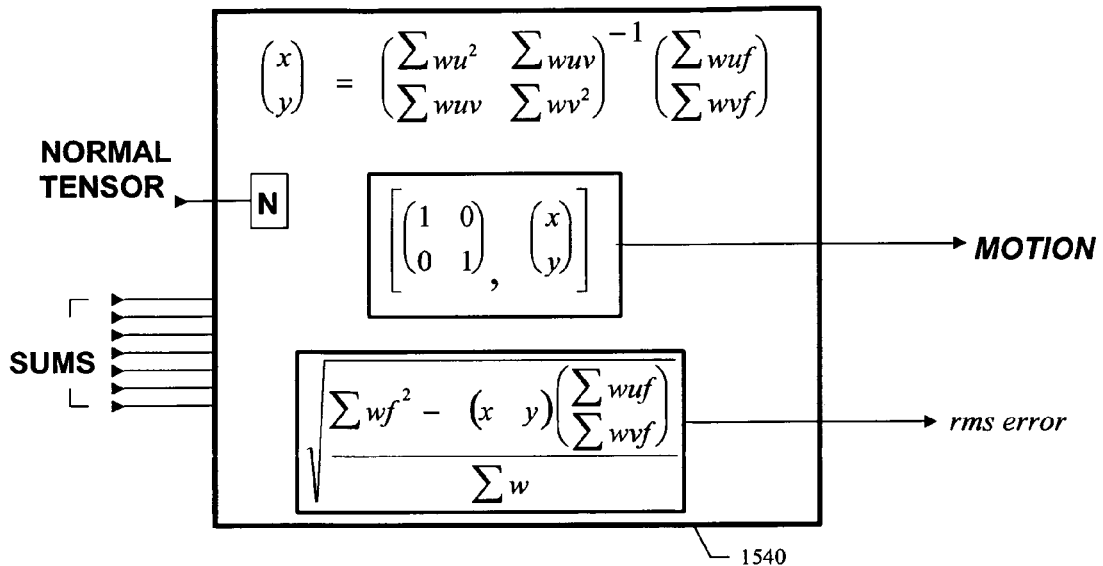
FIGS. 22A–D are block diagram of the solve module of FIG. 15, showing the equations and inputs for providing 'motion' and 'rms error' for various degrees of freedom.
Figure 22B:
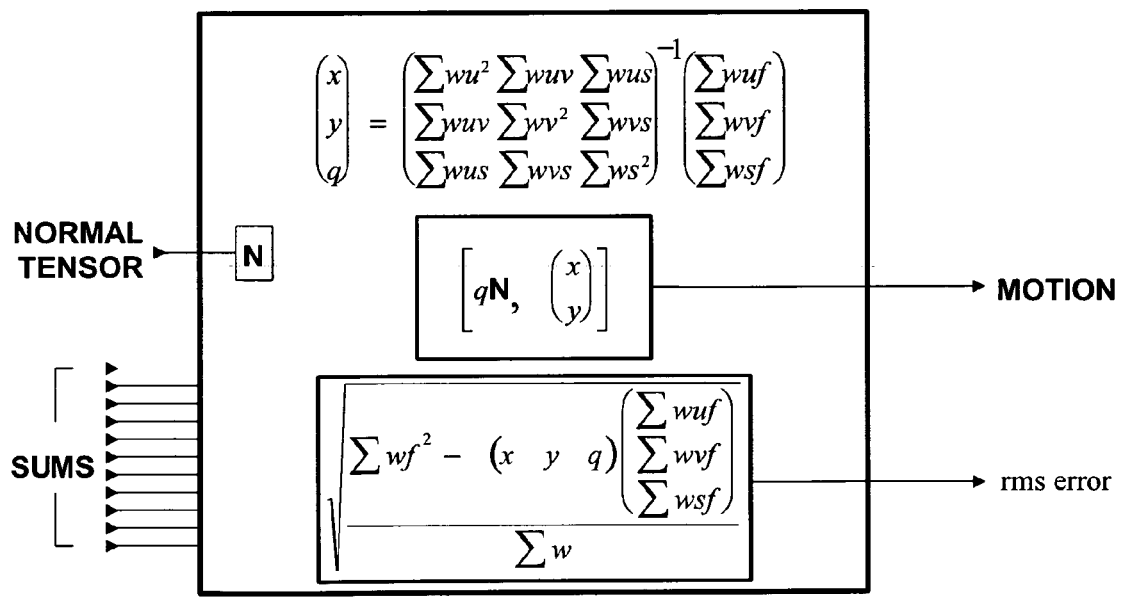
Figure 22C:
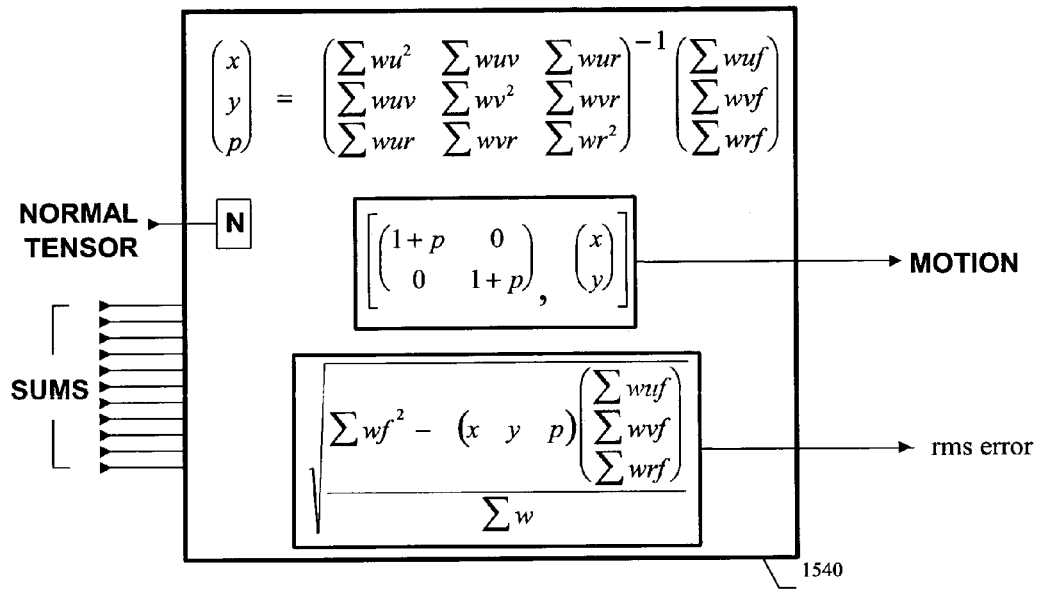
Figure 22D:
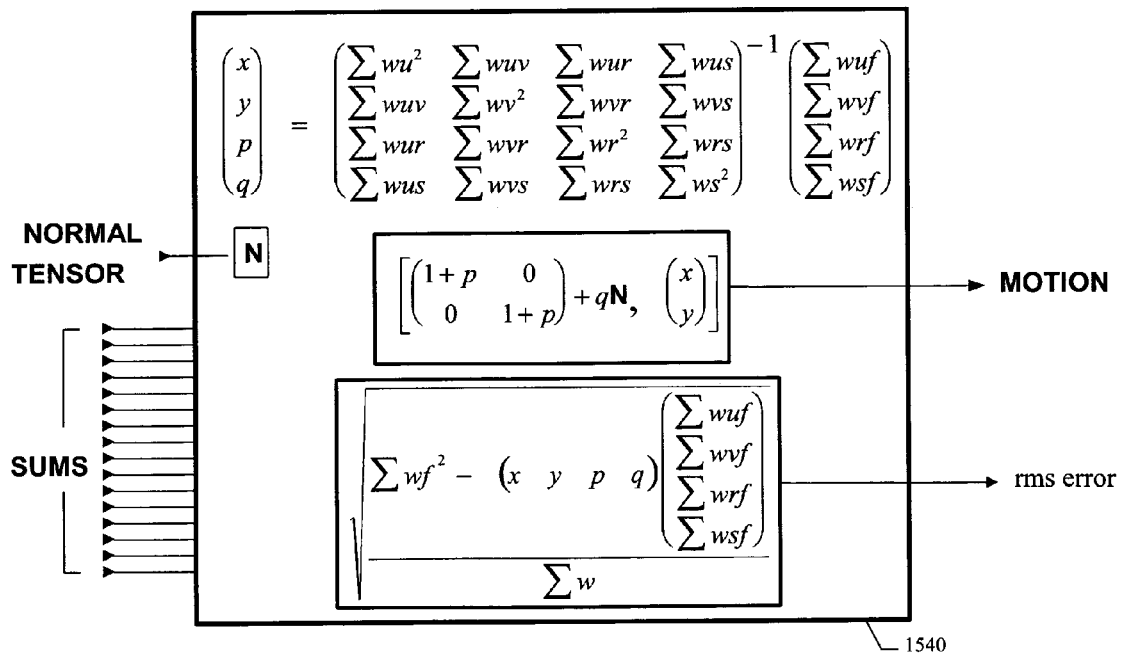

FIG. 22a shows the solution for the 2 translation degrees of freedom only—size and orientation are as specified in the start pose. FIG. 22b shows the solution for translation and orientation. This preferred solution is based on an approximation that assumes a small angle of rotation. If the assumption is violated, some size variation will be introduced. FIG. 22c shows the solution for translation and size, holding orientation fixed, and FIG. 22d shows the solution for all 4 degrees of freedom.

Figure 23:
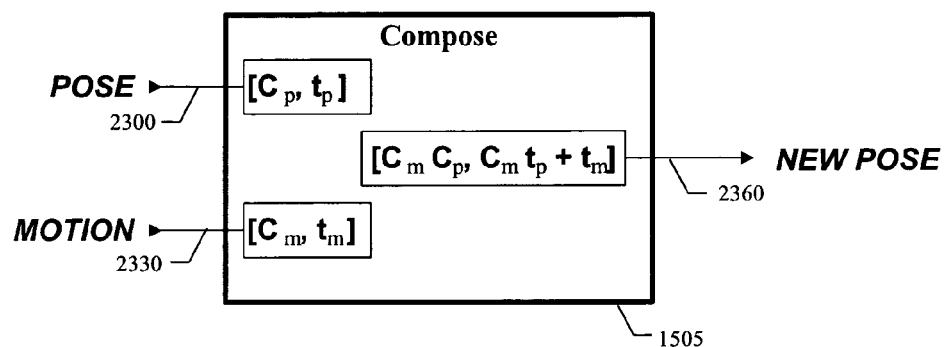
FIG. 23 is a block diagram of the equations of the compose module of FIG. 15.

FIG. 23 gives details of the compose module 1505 of FIG. 15, which composes the current pose 2300 with the motion transform 2330 computed by the solve module 1540 to produce the new pose 2360.

Figure 24:
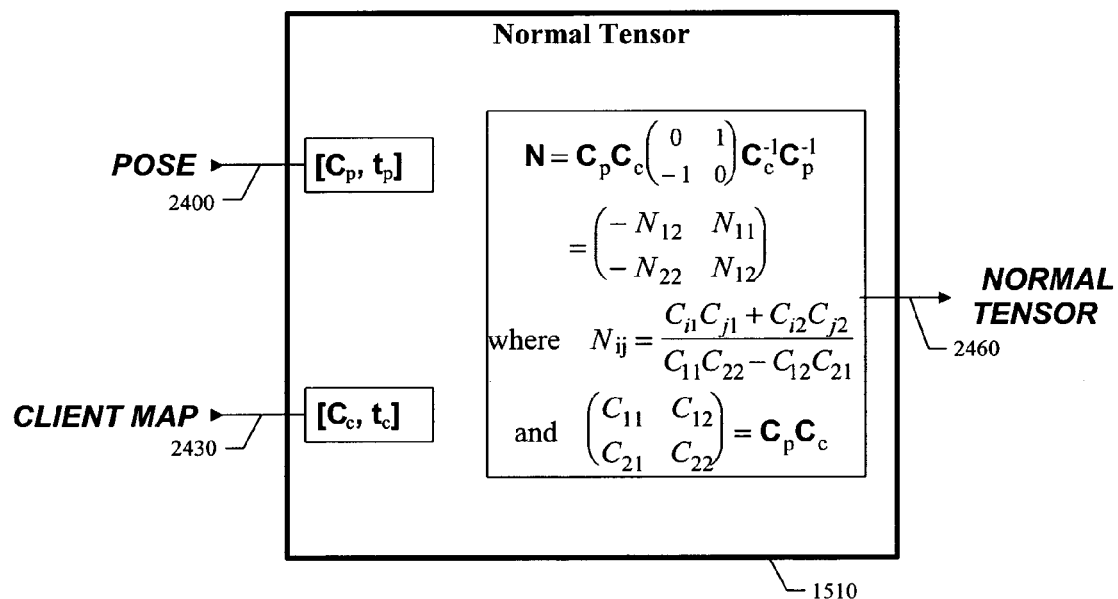
FIG. 24 is a block diagram of the equations of the Normal Tensor module of FIG. 15.

FIG. 24 gives details of the normal tensor module 1510 of FIG. 15, which computes the normal tensor 2460 from the current pose 2400 and the client map 2430.

FIG. 25 shows an example of field dipole evaluation performed as part of field dipole evaluation module 1550 of FIG. 15. In the example, a first image dipole 2500, second image dipole 2510, and third image dipole 2520 have received evaluations 0.85, 0.93, and 0.88 respectively. Four field dipoles labeled 2540, 2550, 2560, and 2570 lie along a chain as determined by connect step 254 during training module 110. The chain is defined by the left links 2580 and right links 2585.

For image dipole 2500, an index 2505 was determined by field module 1525 to identify the nearest field dipole 2540. The evaluation 0.85 is transferred from image dipole 2500 to the "eval1" slot of field dipole 2540.

No image dipole identified field dipole 2550 as nearest, so its "eval1" slot holds its initial value 0.

For image dipole 2510, an index 2515 was determined to identify the nearest field dipole 2560. For image dipole 2520, the same index 2515 was determined to identify the nearest field dipole 2560. The larger of image dipole 2510 evaluation 0.93 and image dipole 2520 evaluation 0.88 is transferred to the "eval1" slot of field dipole 2560.

Field dipole 2570 has evaluation 0.90 transferred from some image dipole not shown.

To fill in the gap at field dipole 2550, a dilation operation is performed, wherein all field dipoles receive an evaluation equal to the maximum of their own evaluation and that of their left and right neighbors. The dilated evaluations are shown in the "eval2" slot of each field dipole. Note that it is not actually necessary to store both "eval1" and "eval2" values; FIG. 25 shows them for clarity.

Once the field dipoles have been evaluated, the coverage value produced by field dipole evaluation module 1350 is computed by averaging all of the field dipole evaluations.

In a preferred embodiment, the field dipoles are evaluated and coverage is computed only after the last attraction step, and only if pattern inspection is desired.

Figure 26:
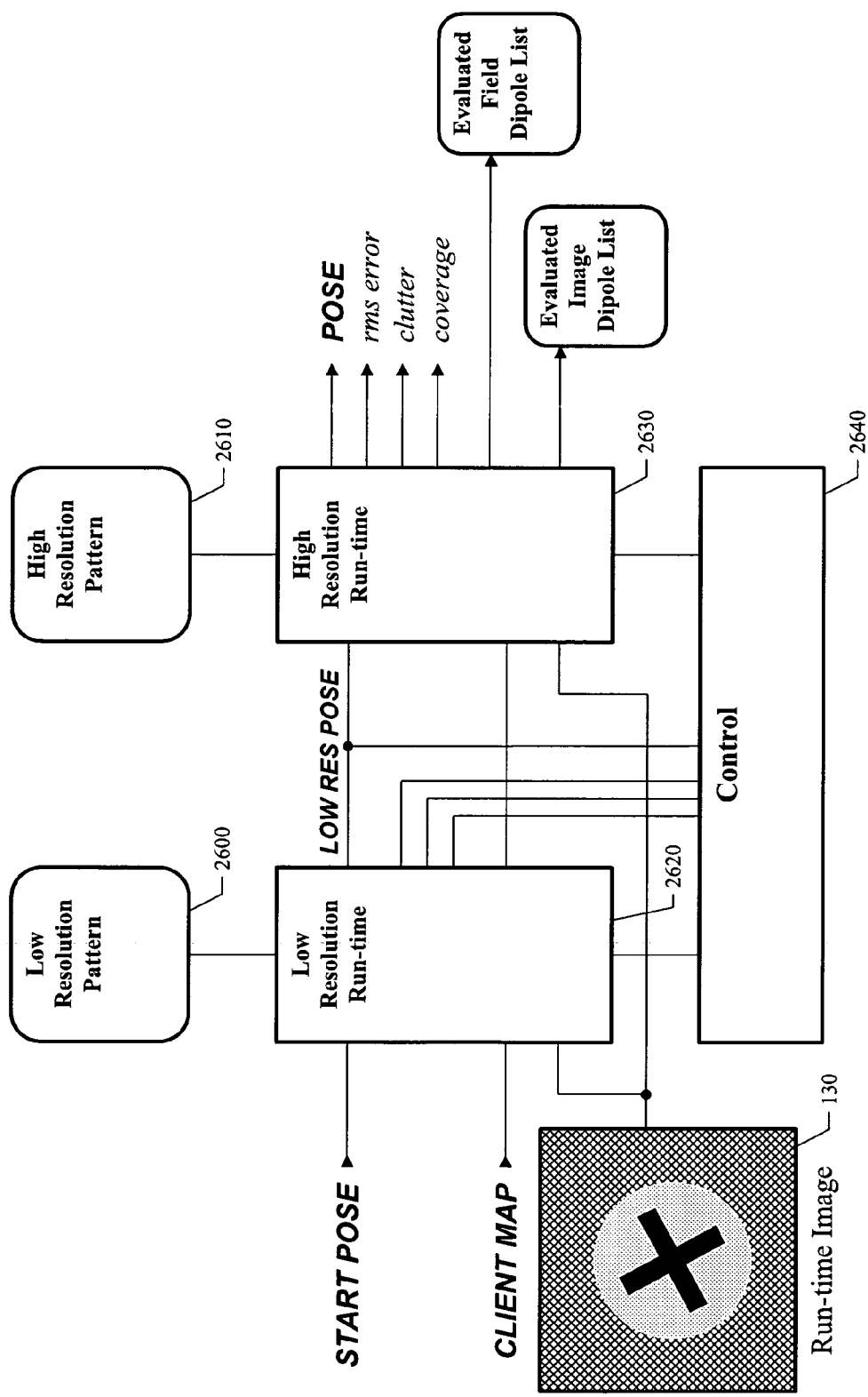
FIG. 26 is a high-level block diagram of a multi-resolution embodiment of the invention.

FIG. 26 shows how the invention can be operated in a multi-resolution mode designed to increase the capture range without sacrificing accuracy. Two pattern training modules (not shown) are run on a single training image, with different settings of low-pass filter module 310 and image sub-sample module 320. In a first setting designed to attenuate fine detail, a low resolution pattern 2600 is generated. In a second setting designed to pass fine detail, a high resolution pattern 2610 is generated.

A low resolution run-time module 2620 uses the low resolution pattern 2600, and a start pose and client map, to analyze run-time image 130 to produce a low resolution pose that is much more accurate than the start pose but not as accurate as can be achieved at higher resolution. A high resolution run-time module 2630 uses the high resolution pattern 2610, the low resolution pose as a start pose, and the same client map, to analyze run-time image 130 to produce the final pose, rms error, coverage, and evaluated dipole lists.

Figure 28:
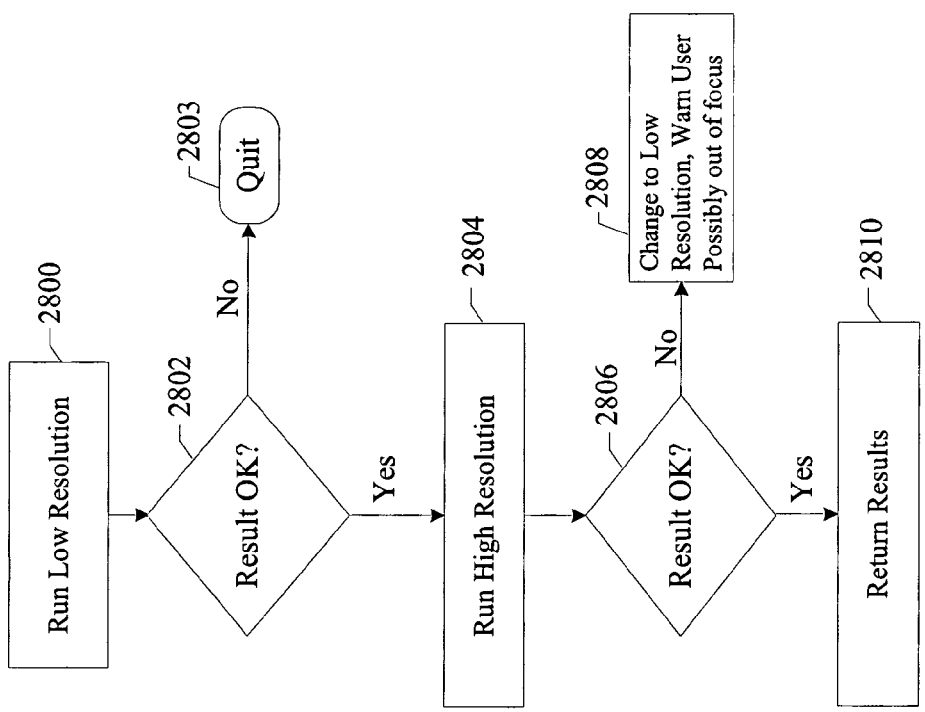
FIG. 28 is a flow diagram illustrating a multi-resolution mode of operation of the invention.

The multi-resolution mode is supervised by overall control module 2640, as illustrated by the flow chart in FIG. 28. As part of its operation 2800, the low resolution rms error, coverage, and clutter values are examined, and if 2802 they do not indicate a reasonable match between image and stored pattern, the operation is aborted 2803 without attempting to run the high resolution module. If the low resolution module produces a good match, high resolution module is run 2804. If the high resolution module does not produce good results 2806, it usually means that the image is out of focus, and the user is so-warned. In some embodiments, when this happens, the low resolution results are used instead of the high resolution results 2808. If the results of the high resolution module are acceptable, the results of the high resolution module are provided to the user 2810 for interpretation, or further processing, according to the particular application.

In a preferred embodiment, an overall match score is computed for each resolution step that is equal to the coverage value minus half the clutter value. The low resolution results are used instead of the high resolution results if the high resolution match score is less than some fraction of the low resolution match score. In a preferred embodiment, the fraction used is 0.9.

In a preferred embodiment, the methods of U.S. Pat. No. 6,457,032, issued Sep. 24, 2002, entitled "Efficient, Flexible Digital Filtering", and U.S. Pat. No. 6,408,109, issued Jun. 18, 2002, entitled "Apparatus and Method for Detecting and Sub-Pixel Location of Edges in a Digital Image" are used for feature extraction, Cognex Corporation's PatQuick™ tool is used to determine the starting pose, and the multi-resolution style of FIG. 26 is used. The following parameter settings are used for feature extraction by default. Many other strategies can be devised to suit specific applications.

For training the low resolution pattern 2600, and corresponding run-time module 2620, the image is sub-sampled by sub-sampler 320 by an equal amount in x and y given by the formula $$\text{floor}\left(\sqrt{\frac{\sqrt{wh}}{8}}\right)$$

where w and h are the width and height, respectively, of the pattern 100 in pixels and the floor function gives the largest integer that is less than or equal to its argument. Note that sub-sampling by n means taking every $n^{th}$ pixel. The low-pass filter 310 uses a filter size parameter ("s" in U.S. Pat. No. 6,457,032, issued Sep. 24, 2002, entitled "Efficient Flexible Digital Filtering") equal to one less than the computed sub-sample amount. The Cartesian to polar conversion module 340 multiplies the gradient magnitude values by 2.0 to improve precision at the low end, where most gradient values lie.

For training the high resolution pattern 2610, and corresponding run-time module 2630, the low-pass filter 310 and the sub-sampler 320 are set to pass the source image 300 unmodified.

As part of its operation, the PatQuick™ tool reports a "contrast" value in gray levels that is the median gradient magnitude of the pixels in the image on which it is run that correspond to the trained pattern. In a preferred embodiment, this contrast value is used to set the default noise threshold for the peak detector 350. Many other schemes for setting noise thresholds are known in the art that can be used to achieve equivalent results.

In said preferred embodiment, PatQuick™ is run on the training image 100 and the contrast value reported by the tool is saved as part of the pattern parameters 220. For training the low resolution pattern 2600, the peak detection module 350 uses a noise threshold equal to 10 gray levels. For training the high resolution pattern 2610, the peak detection module 350 uses a noise threshold equal to one-quarter of said saved contrast.

For the run-time image 130, when the PatQuick™ tool is used to determine the starting pose the contrast value it reports is examined. For both the low resolution run-time module 2620, and the high resolution run-time module 2630, the peak detection module 350 uses a noise threshold equal to that used for the corresponding pattern 2600 or 2610, but in each case multiplied by the ratio of run-time contrast to the saved train-time contrast.

The preferred embodiments described herein use a six-degree-of-freedom coordinate transform to represent the mapping between points in the image and points in the pattern (i.e. the pose), and a least-squares fitting to determine how to use the information provided by the field to modify a given pose so as to produce a new pose that represents a better correspondence between image and pattern features. Many other arrangements can be devised by those of ordinary skill in the art for achieving similar results within the scope of the invention. These other arrangements may have advantages in certain specific applications.

For example, the six degree of freedom coordinate transform can be replaced with other analytic models of the mapping between points in the image and points in the pattern. One useful such model is the well-known perspective transform. Another useful model is one that corrects for lens distortions, such as that-produced by so-called "fish-eye" lenses. In these cases a different least squares solution would be used, and appropriate changes would be made to the pose element 1500, the compose module 1505, the normal tensor module 1510, the map module 1520, the rotate module 1530, the sums module 1535, and the solve module 1540. The image dipole 1515, field module 1525, evaluate module 1545, and field dipole evaluation module 1550 need not change.

In other arrangements, the least squares method can be replaced with other well-known methods for fitting data. In such arrangements, appropriate changes might be made to the rotate module 1530, the sums module 1535, and the solve module 1540. Alternatively, one or more of these modules might be replaced by different modules that are required for the fitting method to be used.

In still other arrangements, a non-analytic mapping between points in the image and points in the pattern, such as a 2-dimensional lookup table with interpolation, may be used. In such an arrangement, the pose 1500 is a lookup table mapping image points to pattern points, and the map module 1520 does the lookup and interpolation. The field module 1525 and evaluate module 1545 can be used without modification. The compose module 1505, normal tensor module 1510, rotate module 1530, sums module 1535, and solve module 1540 are not used. Instead, an intermediate lookup table is produced as follows. For every image dipole 1515, an entry is made in the intermediate lookup table by adding the force vector obtained from the field module 1525 to the mapped position from map module 1520. Along with this field-corrected position, the weight obtained from the evaluate module 1545 is also stored in the intermediate table entry.

The intermediate table thus produced may be sparse, in that many points will not have been filled in, and it may have errors caused by the occasional unreliable image dipole. It can be used, however, to produce a new pose 1500 by applying a smoothness constraint. For example, each element of the new pose can be determined by a weighted mean or median of some neighborhood of corresponding elements of the intermediate table. Other methods for using smoothness as a constraint are well-known in the machine vision literature.

Other modifications and implementations will occur to those skilled in the art without departing from the spirit and the scope of the invention as claimed. Accordingly, the above description is not intended to limit the invention, except as indicated in the following claims.

What is claimed is:

1. A model pattern representing a training image of an object having an expected shape, the model pattern for use in geometric pattern matching with a run-time image having image boundary points, the model pattern comprising:
   a geometric description of the expected shape of the object, the geometric description including a plurality of pattern boundary points in the training image of the object;
   a plurality of field elements disposed within a region of the training image that includes the boundary points; and wherein each zone includes at least one field element that includes the evaluation code.

2. The model pattern of claim 1, wherein each field element comprises:
   a vector indicating distance and direction to a nearest boundary point along a pattern boundary that includes at least some of the boundary points.

3. The model pattern of claim 2, each field element further comprising:
   a bit specifying whether a gradient direction at the nearest boundary point is in the same direction as the vector, or in a direction that is opposite to the direction of the vector.

4. The model pattern of claim 2, each field element further comprising:
   a gradient direction at the nearest boundary point.

5. The model pattern of claim 4, wherein the gradient direction is represented as a 12-bit binary angle within a 360 degree range.

6. The model pattern of claim 2, wherein the vector is represented using a two's complement representation, the most significant bit being a sign bit.

7. The model pattern of claim 6, wherein the vector is represented using a two's complement representation of 16 total bits, and the least significant 11 bits is to the right of the binary point.

8. The model pattern of claim 1, wherein the evaluation code is a "don't care" code that specifies that the image boundary point is to be ignored.

9. The model pattern of claim 1, wherein the evaluation code is an "expect blank" code that specifies that no image boundary point is expected within the region associated with the field element.

10. The model pattern of claim 1, wherein the evaluation code is an "evaluate only" code that specifies that the image boundary point expected within the region associated with the field element is to be used for some purposes, but not for all purposes.

11. The model pattern of claim 1, wherein the evaluation code specifies that the image boundary point expected within the region associated with the field element is to be used for all purposes at least localization and inspection.

12. The model pattern of claim 1, wherein each field element includes a vector indicating distance and direction to a nearest boundary point along a pattern boundary that includes at least some of the boundary points, and wherein the evaluation code determines whether the vector is valid or undefined.

13. The model pattern of claim 1, wherein each field element includes:
   a vector indicating distance and direction to a nearest boundary point along a pattern boundary that includes at least some of the boundary points; and
   a corner code for specifying whether a nearest boundary point is within a high-curvature portion of the pattern boundary, or within a low-curvature portion of the pattern boundary.

14. The model pattern of claim 1, wherein each field element includes:
   a polarity code for specifying whether evaluation of an image boundary point falling within the region associated with the field element should consider or ignore gradient direction associated with the field element.

15. The model pattern of claim 1, wherein the plurality of field elements are in a plurality of zones, each zone being characterized by a code.

16. The model pattern of claim 15, wherein the common code is selected from the group consisting of: consider polarity, and ignore polarity.

17. The model pattern of claim 15, wherein the code is selected from the group consisting of: high-curvature, and low-curvature.

18. The model pattern of claim 15, wherein the code is selected from the group consisting of: care and don't-care.

19. The model pattern of claim 15, wherein the code is selected from the group consisting of:
   don't-care, expect-blank, use-for-some-purposes, and use-for-all-purposes.

20. The model pattern of claim 15, wherein the common code is selected from the group consisting of:
   codes that render a vector of the field element valid, and codes that render a vector of the field element undefined.

21. The model pattern of claim 20, where there are two types of codes that render a vector of the field element within the zone to be valid.

22. The model pattern of claim 20, where there are two types of codes that render a vector of the field element within the zone to be undefined.

23. The model pattern of claim 15, where there are two types of codes that indicate that an image boundary point is to be expected to fall within that zone.

24. The model pattern of claim 15, where there is at least one type of code that indicates that an image boundary point is not to be expected to fall within that zone.

25. The model pattern of claim 1, wherein each field element is represented as a 32-bit word.

26. The model pattern of claim 1, wherein the field elements are arranged as a regular array having a grid spacing similar to the grid spacing of the run-time image.

27. The model pattern of claim 1, wherein each field element comprises:
information that is stored as a function of position.

28. The model pattern of claim 27, wherein the information is stored as a function of real-valued position within the region of the training image that includes the boundary points.

29. The model pattern of claim 27, wherein the information is stored at discrete points on a Arid using a two-dimensional array.

30. The model pattern of claim 27, wherein the information is a vector-valued function of position within the region of the image that includes the boundary points.

31. The model pattern of claim 30, wherein the vector-valued function relates a plurality of at least two-dimensional positions to a plurality of respective displacement vectors.

32. The model pattern of claim 31, wherein each displacement vector indicates a distance and direction from a two-dimensional position to a nearest point along a pattern boundary formed by the boundary points.

33. The model pattern of claim 30, wherein the vector-valued function relates a plurality of two-dimensional positions and associated gradient directions to a plurality of respective displacement vectors.

34. The model pattern of 33, wherein each displacement vector indicates distance and direction from a two-dimensional position to a nearest point along a pattern boundary that is substantially in the associated direction.

35. A model pattern representing a training image of an object having an expected shape, the model pattern for use in geometric pattern matching with a run-time image having image boundary points, the model pattern comprising:
a geometric description of the expected shape of the object, the geometric description including a plurality of pattern boundary points in the training image of the object;
a plurality of zones, each zone being characterized by an evaluation code for determining whether an image boundary point within the zone is to be evaluated; and
wherein each zone includes at least one field element that includes the evaluation code.

36. The model pattern of claim 35, wherein the evaluation code is a "don't care" code that specifies that an image boundary point within the zone is to be ignored.

37. The model pattern of claim 35, wherein the evaluation code is an "expect blank" code that specifies that no image boundary point is expected within the zone.

38. The model pattern of claim 35, wherein the evaluation code is an "evaluate only" code that specifies that the image boundary point within the zone is to be used for some purposes, but not for all purposes.

39. The model pattern of claim 35, wherein the evaluation code specifies that the image boundary point within the zone is to be used at least for localization and inspection.

40. The model pattern of claim 35, wherein the evaluation code is a polarity code for specifying whether evaluation of an image boundary point within the zone should consider or ignore polarity.

41. The model pattern of claim 35, wherein to consider polarity is to consider gradient direction at the image boundary point.

42. The model pattern of claim 35, wherein the evaluation code is selected from the group consisting of: attract, evaluate only, expect blank, and don't-care.

43. The model pattern of claim 35, wherein the evaluation code is selected from the group consisting of: don't-care, expect-blank, use-for-some-purposes, and use-for-all-purposes.

44. The model pattern of claim 35 wherein there are two types of evaluation codes that indicate that an image boundary point is to be expected to fall within the zone.

45. The model pattern of claim 35, wherein there is at least one type of code that indicates that an image boundary point is not to be expected to fall within the zone.

* * * * *